US010466056B2

(12) United States Patent
Jiang et al.

(10) Patent No.: US 10,466,056 B2
(45) Date of Patent: Nov. 5, 2019

(54) TRAJECTORY MATCHING USING AMBIENT SIGNALS

(71) Applicant: Samsung Electronics Co., Ltd., Suwon-si, Gyeonggi-do (KR)

(72) Inventors: Yifei Jiang, Santa Clara, CA (US); Koichi Mori, San Jose, CA (US); Shalinder S. Sidhu, Saratoga, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 841 days.

(21) Appl. No.: 14/571,166

(22) Filed: Dec. 15, 2014

(65) Prior Publication Data

US 2015/0308839 A1 Oct. 29, 2015

Related U.S. Application Data

(60) Provisional application No. 61/984,381, filed on Apr. 25, 2014.

(51) Int. Cl.
*G01C 21/32* (2006.01)
*G01S 19/12* (2010.01)

(52) U.S. Cl.
CPC .............. *G01C 21/32* (2013.01); *G01S 19/12* (2013.01)

(58) Field of Classification Search
CPC ................................ G01C 21/32; G01S 19/12
See application file for complete search history.

(56) References Cited

U.S. PATENT DOCUMENTS 5,406,491 A 4/1995 Lima
5,774,824 A 6/1998 Streit et al.
7,145,478 B2 12/2006 Goncalves et al.
7,203,497 B2 4/2007 Belcea
7,250,907 B2 7/2007 Krumm et al.
7,439,907 B2 10/2008 Wang et al.
8,095,155 B2 1/2012 Wang
8,320,939 B1 11/2012 Vincent
8,359,156 B2 1/2013 Guo et al.
(Continued)

FOREIGN PATENT DOCUMENTS

CN WO 2014026338 A1 * 2/2014 ........... G01C 21/206
WO 2014/026338 2/2014

OTHER PUBLICATIONS

Ferrer et al. "Microaggregation- and permutation-based anonymization of movement data," Apr. 2012, Informatin Sciences, pp. 56-78.*
(Continued)

*Primary Examiner* — Mohamed Charioui
*Assistant Examiner* — Eyob Hagos

(57) ABSTRACT

A technique to automatically determine a shape of a path based on crowdsourced trajectory data is disclosed. Trajectory data is collected for a plurality of crowdsourced paths. The trajectory data for each of the plurality of crowdsourced paths is associated with at least one uniquely identifiable ambient signal. Anchor points may be identified corresponding to a transition in a characteristic of trajectory data of an individual crowdsourced path. Matching may be performed based on analyzing matching patterns of anchor points and evaluating the matches. Various embodiments involve using a linked node structure to represent one or more traces and/or indicate routes in a particular geographical area.

17 Claims, 19 Drawing Sheets

(56) References Cited

U.S. PATENT DOCUMENTS

| | | | |
|---|---|---|---|
| 8,374,785 | B2 | 2/2013 | McBurney et al. |
| 8,380,220 | B2 | 2/2013 | Alles et al. |
| 8,457,880 | B1 | 6/2013 | Malalur et al. |
| 8,472,980 | B2 | 6/2013 | Khorashadi et al. |
| 8,473,241 | B2 | 6/2013 | Foxlin |
| 8,660,581 | B2 | 2/2014 | Davis et al. |
| 8,670,922 | B2 | 3/2014 | Kaneda et al. |
| 8,672,810 | B2 | 3/2014 | Molyneux et al. |
| 2003/0135324 | A1 | 7/2003 | Navab |
| 2005/0243936 | A1 | 11/2005 | Agrawala et al. |
| 2008/0161011 | A1 | 7/2008 | Babin et al. |
| 2008/0188236 | A1 | 8/2008 | Alles et al. |
| 2008/0188237 | A1 | 8/2008 | Alles et al. |
| 2009/0043504 | A1 | 2/2009 | Bandyopadhyay et al. |
| 2009/0054076 | A1 | 2/2009 | Evennou et al. |
| 2010/0198814 | A1 | 8/2010 | Petersen et al. |
| 2010/0304757 | A1 | 12/2010 | Yoshioka |
| 2011/0151898 | A1 | 6/2011 | Chandra et al. |
| 2011/0172916 | A1 | 7/2011 | Pakzad et al. |
| 2011/0208424 | A1 | 8/2011 | Hirsch et al. |
| 2011/0313779 | A1 | 12/2011 | Herzog et al. |
| 2012/0007779 | A1 | 1/2012 | Klepal et al. |
| 2012/0020533 | A1 | 1/2012 | Liu et al. |
| 2012/0021762 | A1 | 1/2012 | Garin et al. |
| 2012/0044265 | A1 | 2/2012 | Khorashadi et al. |
| 2012/0072106 | A1 | 3/2012 | Han et al. |
| 2012/0102164 | A1 | 4/2012 | Grun et al. |
| 2012/0102165 | A1 | 4/2012 | Gruen et al. |
| 2012/0129546 | A1 | 5/2012 | Yang et al. |
| 2012/0130625 | A1 | 5/2012 | Srivastava |
| 2012/0130762 | A1 | 5/2012 | Gale et al. |
| 2012/0182933 | A1 | 7/2012 | Bandhakavi et al. |
| 2012/0184292 | A1 | 7/2012 | Lin et al. |
| 2012/0185458 | A1 | 7/2012 | Liu et al. |
| 2012/0264447 | A1 | 10/2012 | Rieger, III |
| 2012/0294532 | A1 | 11/2012 | Morris |
| 2012/0295632 | A1 | 11/2012 | Karlsson et al. |
| 2012/0303556 | A1 | 11/2012 | Lin et al. |
| 2013/0006517 | A1 | 1/2013 | Ofek et al. |
| 2013/0084882 | A1 | 4/2013 | Khorashadi et al. |
| 2013/0084891 | A1 | 4/2013 | Khorashadi et al. |
| 2013/0095848 | A1 | 4/2013 | Gold et al. |
| 2013/0122935 | A1 | 5/2013 | Das et al. |
| 2013/0166195 | A1 | 6/2013 | Bandyopadhyay et al. |
| 2013/0166202 | A1 | 6/2013 | Bandyopadhyay et al. |
| 2013/0201365 | A1 | 8/2013 | Wirola et al. |
| 2013/0204652 | A1 | 8/2013 | Marins et al. |
| 2013/0222369 | A1 | 8/2013 | Huston et al. |
| 2013/0244693 | A1 | 9/2013 | Das et al. |
| 2013/0023282 | A1 | 10/2013 | Lin et al. |
| 2013/0293416 | A1 | 11/2013 | Waters et al. |
| 2013/0322702 | A1 | 12/2013 | Piemonte et al. |
| 2013/0331121 | A1* | 12/2013 | Bandyopadhyay ... H04W 64/00 455/456.1 |
| 2013/0335273 | A1 | 12/2013 | Pakzad et al. |

OTHER PUBLICATIONS

Giannotti et al., "Trajectory Pattern Mining.", Pisa KDD Laboratory. Aug. 2007.

Aung et al. "TrajAlign: A Method for Precise Matching of 3-D Trajectories.", International Conference on Pattern Recognition. 2010.

Wang et al., "No Need to War-Drive: Unsupervised Indoor Localization.", MobiSys'12. Jun. 2012.

TRX Systems., "NEON Indoor Location.", http://www.trxsystems.com/gps-denied-navigation-products. 2013.

Navizon, Inc., "Indoor Triangulation System.", http://www.navizon.com., 2011.

Feng et al., "Wifi-based Indoor Navigation with Mobile GIS and Speech Recognition.", International Journal of Computer Science Issues, vol. 9, Issue 6, No. 2, Nov. 2012.

Schroedl et al. "Mining GPS Traces for Map Refinement" Data Mining and Knowledge Discovery, Kluwer Academic Publishers, 2004 pp. 59-87.

Extended European Search Report from European Application No. 15783844 dated Nov. 27, 2017.

Han Su et al., Calibrating Trajectory Data for Similarity-based Analysis, SIGMOD'13, Jun. 22-27, 2013, p. 833-844.

Mao Lei, "In view of smartphone's energy-saving daily location tracking service calculation and implementation", Chinese Master's Thesis Database (Electronic Journal) Science and Technology, First issue of 2014, Jan. 2014, pp. 40-41.

Office Action dated Oct. 17, 2018 in connection with Chinese Patent Application No. 2015800220818, 28 pages.

* cited by examiner $$\text{Score} = \frac{\text{WiFi-Simi}(\textcircled{1}, \textcircled{A})}{\text{Distance}(\textcircled{1}, \textcircled{A})}$$

TRAJECTORY MATCHING USING AMBIENT SIGNALS

CROSS-REFERENCE TO RELATED APPLICATION

This application claims priority to U.S. Provisional Patent Application No. 61/984,381, entitled "Turn Based Indoor Trajectory Matching Using Wi-Fi Signals," filed Apr. 25, 2014, which is incorporated herein in its entirety for all purposes.

FIELD OF THE INVENTION

The present invention is generally related to techniques to utilize trajectory data from ambient signals to help generate maps of paths for location based services. Various embodiments of the present invention are directed to utilizing crowd-sourced trajectory data to determine relative position between paths. Some implementations involve using a linked node structure to represent routes in a particular area.

BACKGROUND OF THE INVENTION

There are a variety of approaches to track a location of an individual based on global positioning system (GPS) data. However, GPS often does not work reliably in an environment with weak or unreliable GPS data. Therefore, there is increasing interest in developing new techniques to provide location-based services.

Trajectory data may be generated using information generated by a user's mobile device, where the mobile device can take different forms depending on the location based service. As an example, trajectory data may be calculated using pedestrian dead reckoning (PDR) based on information generated from the user's mobile device without relying on conventional RF infrastructure such as Wi-Fi networks or Bluetooth beacons. As examples, an accelerometer or magnetometer (compass) on the mobile device may be used to generate information to perform pedestrian dead reckoning.

Trajectory data using PDR has been widely used for indoor tracking and positioning for individuals. Given a start point with an initial known location, such as a GPS coordinate, an indoor localization system can track a user's current position using indoor trajectory data by estimating the number of steps and direction of movement.

Another application of trajectory data using PDR is understanding indoor activity patterns of users. Indoor trajectory data collected from users is an important data source for activity pattern analysis. For example, how often a user moved in a shopping mall and how long he stayed in front of a shopping shelf may indicate the users' shopping interests and contextual information. Aggregating indoor trajectory data from multiple users may help a store owner to find out problems of shelf arrangement. The store owner may use the data to improve arrangement for improving user's shopping experience, and gaining store profit.

Another application of trajectory data using PDR is indoor mapping. Indoor trajectory data may be use to map an indoor environment. In turn, the generated maps can be used for indoor location based services.

However, a problem with calculating trajectory data using PDR is that many mobile devices, such as smartphones, have significant compass noise and gyroscope noise. Thus, even if an initial accurate location was available, there is noise in any subsequent PDR calculation based on the smartphone's sensor data. For example, FIG. 1A shows a floor plan and a path used for indoor trajectory data collection. FIG. 1B illustrates two trajectories 110 and 120 based on two rounds of PDR data calculation. The indoor trajectories are not well overlapped because of the noise in the smartphone's gyro and compass. In particular, the initial heading of the indoor trajectories have a drift and the angle of each corner on the two trajectories is slightly different.

Another problem with conventional PDR is the different start points of trajectories. Referring to FIG. 2A, suppose two different instances of trajectory data are acquired. The data may be acquired for two paths that largely (but not completely) overlap and which have different starting points. For example, two different individuals in an office may have different cubicles (different starting points) but may otherwise navigate certain common segments of the indoor locations. In any case, the initial starting points of each instance may be different and the paths do not have to be identical. As illustrated. In the most general case the starting points are offset. The fact that there are different starting points, combined with gyro and compass errors, has the result that the two trajectories may be totally mismatched when plotted in the same coordinate system, as illustrated in FIG. 2B for traces 205 and 210. This is a fundamental problem for most indoor trajectory based location systems.

Various existing solutions improve accuracy and permit matching different paths typically require prior knowledge of trajectories or information manually provided by users such that the techniques are not fully automatic. For example, some approaches require special training data, the identification of landmarks, or special Bluetooth nodes.

Therefore, in view of these problems the present invention was developed.

SUMMARY OF THE INVENTION

An apparatus, system, and method is described to automatically determine a path from crowdsourced trajectory data associated with a plurality of crowdsourced paths. Individual mobile devices receive ambient signals. The trajectory data from one or more mobile devices is collected. Anchor points are identified in the trajectory data, where an anchor point corresponds to a transition in a characteristic, such as a turn, a sudden stop, or other activity.

The anchor points in the trajectory data of each crowdsourced path have a unique pattern. Sets of crowdsourced paths may be matched based on the anchor points. The different permutations of the anchor points may be determined. Individual permutations may be eliminated if the ambient signals have a similarity inconsistent with the paths being true matches. A scoring algorithm may take into account the similarity of the ambient signals of a match being evaluated, as well as the geometrical factors, such as a distance, associated with match.

One embodiment of a computer-implemented method includes collecting trajectory data for a plurality of crowdsourced paths. The trajectory data for each of the plurality of paths is associated with at least one uniquely identifiable ambient signal. A shape of a path is automatically determined based on the trajectory data for the plurality of crowdsourced paths and their at least one associated ambient signal.

In one aspect, a computer implemented method includes maintaining a linked node structure based on one or more traces. The linked node structure includes one or more nodes and one or more links. Each node is associated with a particular geographical location traversed by the one or more traces. Each link connects a pair of nodes indicating an available path between the locations associated with the connected nodes. One or more points of a new trace are matched with one or more nodes in the linked node structure. Each point is identified based on an identifiable change of the new trace. The linked node structure is updated based on the matching.

DETAILED DESCRIPTION

Figure 1A:
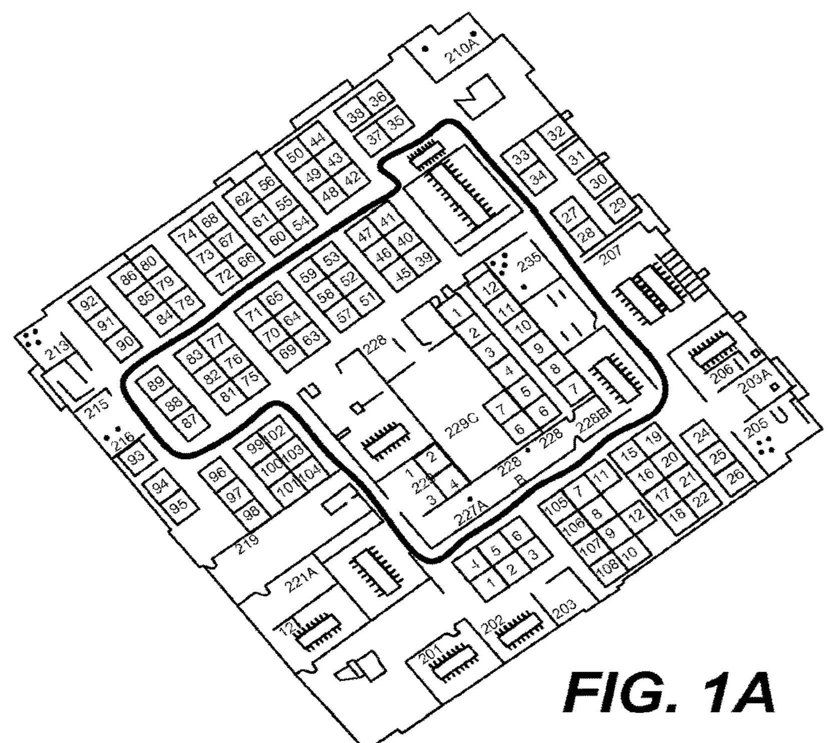
FIGS. 1A and 1B illustrate the problems of sensor error in matching two traces of trajectory data in accordance with the prior art.
Figure 1B:
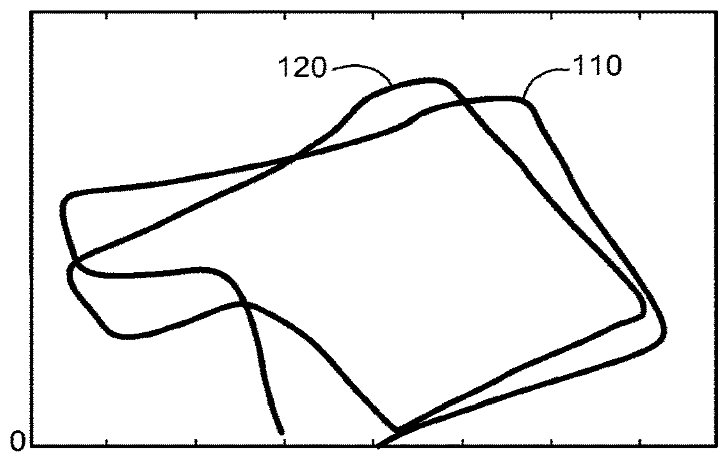
Figure 2A:
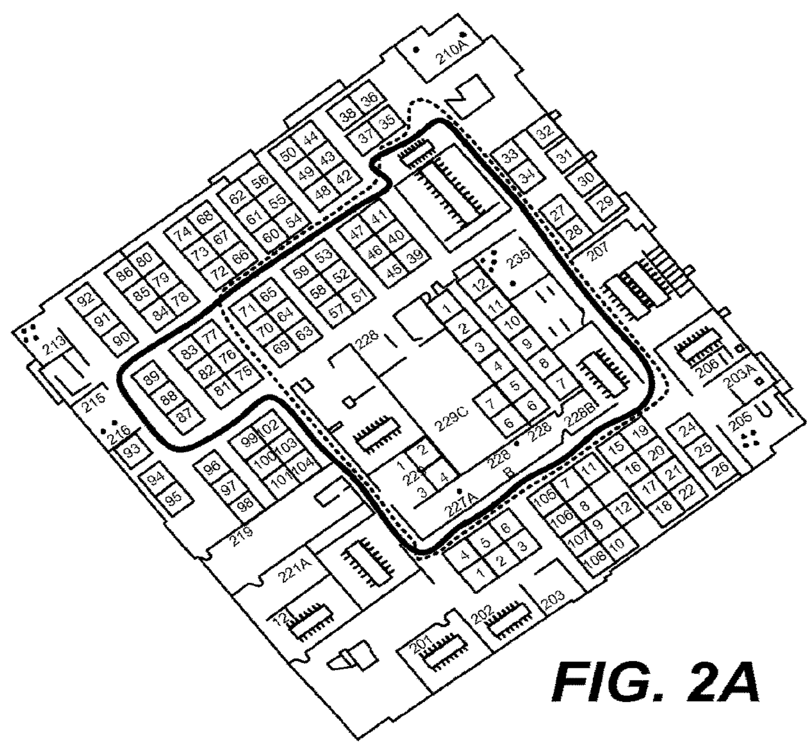
FIGS. 2A and 2B illustrate the problems of a starting offset in matching two traces of trajectory data in accordance with the prior art.
Figure 2B:
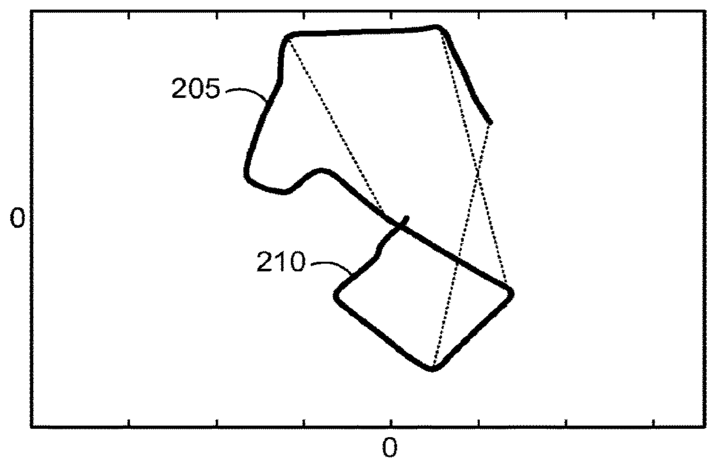
Figure 3:
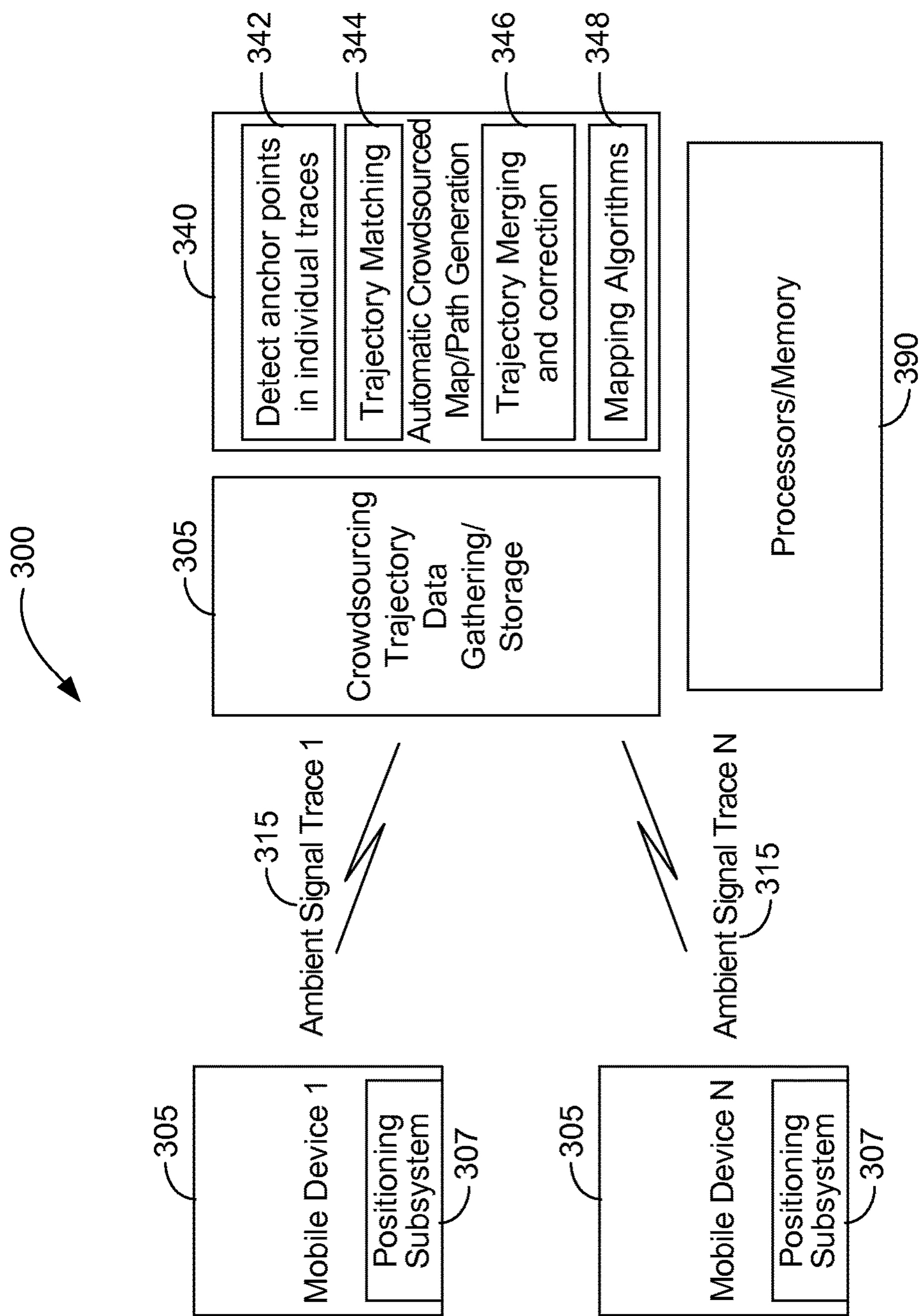
FIG. 3 illustrates a system in accordance with an embodiment of the present invention.

FIG. 3 illustrates an exemplary system environment 300 for practicing embodiments of the present invention. In one embodiment, individual mobile devices 305 generate position data. An individual mobile device provides an ambient signal 315 that includes trace data providing relative sequential position information from which trajectory data can be directly or indirectly determined. An individual ambient signal 315 preferably includes a unique ID or unique characteristics.

The trajectory data is collected by a crowdsourcing data gathering and storage unit 330 that collects and stores trajectory data. In one embodiment the position data is generated by Pedestrian Dead Reckoning (PDR), utilizing on-board sensors of the mobile device and a positioning subsystem 307 to estimate a position of the mobile device and generate trajectory data. In various embodiments, the positioning subsystem 307 estimates a position relative to a determined starting point or first position e.g., the first position may be 0,0 in an x-y coordinate system. It should be appreciated, however, that any suitable positioning system or coordinate system may be used. For the case of PDR, examples of sensors on board the mobile device may include gyros, compasses, and accelerometers to determine pedestrian motion based on the sensor data and factors such as step length. More generally, the positioning subsystem 307 of the mobile device could generate position data using other techniques and include any trajectory data generated by the mobile device. Certain types of data, such as GPS data, may only be available for certain circumstances, such as an outdoor activity. Thus, it will be understood that two or more different types of trajectory may be used if the different types of trajectory data are available. The trajectory data may be collected in an indoor environment or in an outdoor environment.

Each mobile device 305 may, for example, be implemented as a smartphone having on board sensors, a processor, memory, and wireless communication capabilities. However more generally, the mobile device 305 is not limited to a smartphone implementation and may include other types of mobile devices such as mobile robots, mobile vehicles, or cars.

The data gathering and storage unit 330 collects and stores trajectory data from at least one mobile device. In a crowdsourcing application the data gathering and storage unit 330 collects and stores trajectory data from at least two mobile devices and preferably multiple mobile devices, N, in order to crowdsource the collection of trajectory data for a selected location. Additionally it will be understood that multiple instances of trajectory data from the same mobile device may be collected. The location may be an indoor building. However, more generally the location does not have to be limited to an indoor building. The location could be an outdoor environment, such as an outdoor complex. The mobile device may be a handheld mobile device or other types of portable devices carried by users. However more generally, the mobile device could include a mobile vehicle, such as a car or other type of transportation vehicle. The trace data collected for the different mobile devices does not have be limited to data obtained on exactly the same path and may correspond to somewhat different paths, partially overlapped paths, or paths with different offsets such as might occur when multiple users walk through a building or area that does not force the users to walk exactly the same path. It will be understood that the data gathering and storage unit 330 includes hardware such as a processor, memory. The data gathering and storage unit 330 may also directly receive and detect the ambient signals or receive the information from another signal detection entity.

The ambient signal preferably includes a unique ID to identify an individual trace, such as a mobile device ID or MAC ID, although this is not a requirement. The ambient signal may be implemented using a Wi-Fi signal or Bluetooth signal, although more generally it may be implemented by other signaling medium such as optical images, magnetic/electromagnetic, sound, and light Wi-Fi signals and Bluetooth signals are examples of electromagnetic signals. However, more generally analogous techniques may be used for other signaling medium besides electromagnetic signals. For example, if the ambient signal is high frequency sound then a microphone may receive sound waves, where the strength or frequency of the sound waves may vary. Optical detectors may be used to detect the color of the light, the strength of the light, or other optical characteristics. Optical images may be captured with a camera and processed via computer vision techniques. Magnetic strength may be determined by a magnetic detector. While each of the different signaling medium may be used to detect turns based on computing a similarity of traces, it will be understood that they may also be used to detect similarities in traces of other types of stable patterns of movement that tend to repeat in a particular location, such as a user slowing down to move through a gate, a user moving past a particular store or location, or a movement over bumps or other features or obstacles along a path.

An embodiment using sound may detect turns or other patterns of movement based on sound patterns. For example, consider an example where there is a mall with a series of stores, shops, and restaurants that are part of the mall. Some of the sites in the mall may continually play background music or have other associated sounds that remain the same, in terms of a sound pattern, during time periods of interest (e.g., business hours at a mall). In this example, the pattern of sound varies as a user walks around the mall. When a user passes a store, the music played in the store (or the sound) has an associated sound pattern. This sound pattern can be detected and interpreted as a “turn”. That is, in some environments the sound pattern in a particular location is fairly stable (e.g., background music in one store and no background music in other stores) such that the sound patterns of two traces can be analyzed for similarity.

In one embodiment using light as the signaling medium a comparison is made of the luminous intensity, a measure of the wavelength-weighted power emitted by a light source in a particular direction per unit solid angle. Based on the luminosity function, (based on a standardized model of the sensitivity of the human eye) is collected at turns. A threshold difference in luminous intensity may be used to make an initial determination that two turns are not in the same position. For example, suppose the luminous intensity is different by more than a threshold difference of ten percent. In this case a decision is made that that the two turns are not in the same position. A spectral power distribution may be used to compute a similarity of two turns. If two turns might be at same position then the spectral power distribution (SPD) may be used to further compute the similarity. If the SPD of two instances of light data at two turns are similar within a selected similarity condition (e.g., 83% similar), then a determination is made that the two turns are at same position. Additionally, this approach may be extended to compare a SPD similarity of other patterns of movement besides turns and identify matches.

For the case of optical images, optical images can be taken at each turn and a comparison can be made of the similarity of those images. The comparison can use computer vision techniques such as keypoint matching. Another less robust but potentially faster solution is to build feature histograms for each image, and then compare the histogram of images. If two images are similar (e.g., 90%), the turns of the two images are at same position. Additionally, this approach may be extended to used computer vision techniques to detect patterns of movement besides turns and identify matches.

Magnetic strength may vary over a geographic location and a magnetic detector used to detect the magnetic strength. In one embodiment magnetic strength is collected near each turn. A comparison is made of the similarity of curves of the magnetic strength sequence (over time). If two curves are similar according to a threshold similarity (e.g., 82%), the turns of two magnetic strength sequence are at same position. Additionally, this approach may be extended to compare the similarity of a magnetic strength sequence for other patterns of movement besides turns and identify matches.

In one embodiment an automatic map generation unit 340 includes a unit 342 to detect anchor points in individual traces, a unit 344 to perform trajectory matching, a unit 346 to perform trajectory merging and correction, and a unit to perform path mapping 348. The trajectory merging and correction unit 346 merges trajectories from multiple users if the trajectories are from the same location. The mapping unit 348 generates maps from merged and corrected trajectories together, which may also include other data collected from users. The units of the automatic map generation unit 340 may be implemented as software modules residing on a computing system including hardware elements 390 such as at least one processor and a memory.

Figure 4:
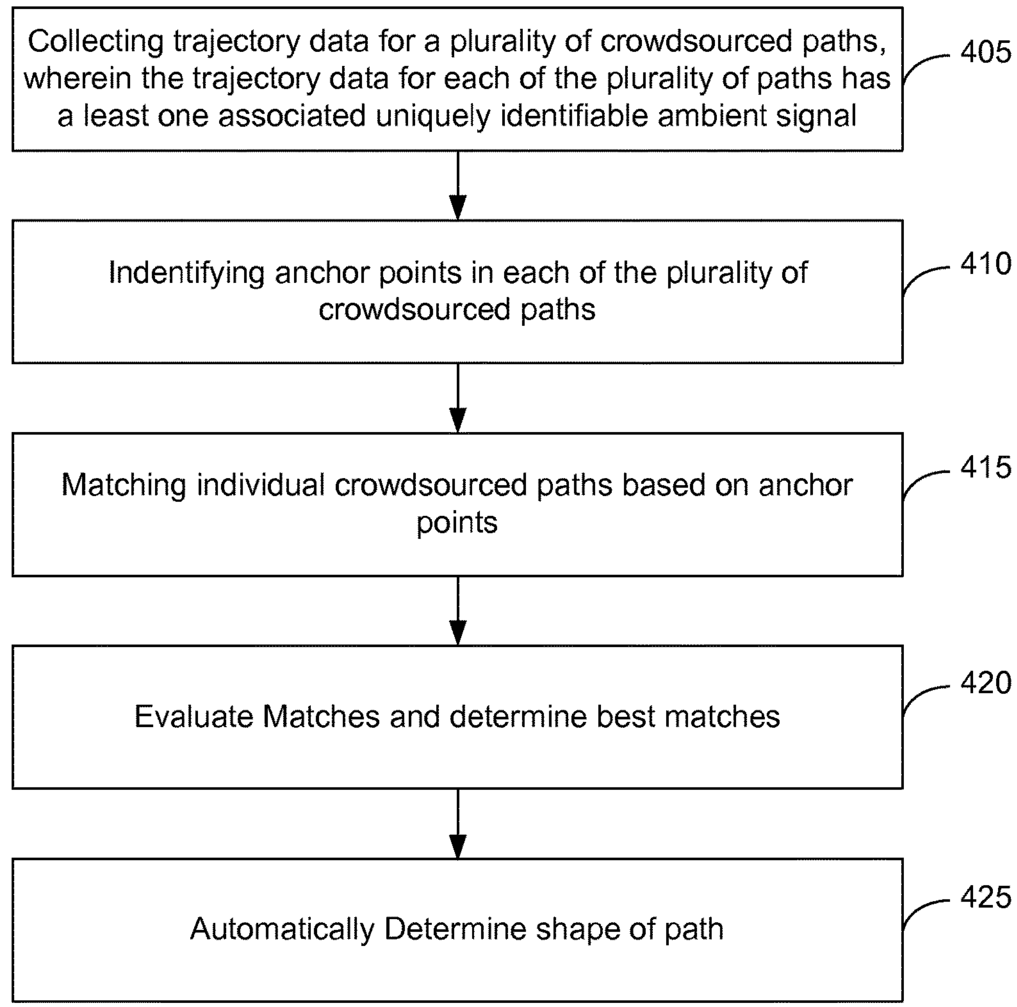
FIG. 4 illustrates a method of automatically determining a path via crowdsourcing in accordance with an embodiment of the present invention.

FIG. 4 is a flowchart of a method in accordance with an embodiment of the present invention. In block 405, trajectory data is collected for a plurality of crowdsourced paths. The trajectory data for each of the plurality of paths is associated with at least one uniquely identifiable ambient signal, in block 410, anchor points are identified in each of the plurality of crowdsourced paths.

An anchor point corresponds to a transition in a characteristic of trajectory data, such as changes in orientation or acceleration associated with events such as turns, stops, speed changes, jumps, or that are characteristic of a specific user activity, such as opening a door. Additionally, for the case of a mobile vehicle or a car, the anchor point may correspond to a transition in a characteristic detected by a sensor such as a change associated with a speed change, stop, bump, or obstacle on a path. A first set of anchor points in a first trace of trajectory data may be used like a fingerprint to identify a first pattern. A second set of anchor points in a second trace of trajectory data has a second pattern with potential correspondences to the first pattern. The potential matches between the patterns may be evaluated.

As shown in block 415, individual crowdsourced paths may be matched based on anchor points. Given sensor errors and potential offset, two traces may be translated and rotated with respect to each other to bring the traces into a corrected alignment. Trace adjustment/correction may also be performed using geometrical mapping operations to align a pair of traces with a specific set of matched anchor points. This may include rotation and translation of traces to perform the trace adjustment/correction. Alternatively, the geometric shape of the trajectories may be used to determine a geometrical adjustment/correction. The process may be performed for all possible matches of the trajectory data for different traces in a given location, resulting in a potentially large number of possible matches.

One or more rules may be included to eliminate combinations which are impossible based on characteristics of the ambient signals. For example, certain matches of anchor points may be theoretically possible as permutations, but highly unlikely given an evaluation of the similarity of the underlying ambient signals. Thus, in one embodiment characteristics of the ambient signals of two traces being considered for a match are analyzed to eliminate unlikely matches.

The best match is evaluated in block 420. An evaluation is performed by taking into account both the similarity of the ambient signals of a match and the geometric aspects of the trajectories that are being matched. Even if the ambient signals have a high similarity, the geometrical distances may weigh against giving a match a high score. In one embodiment a scoring algorithm may rate matches based on a calculation of a similarity of the ambient signals and further taking into account a geometrical distance associated with pairs of anchor points. All of the possible matches are evaluated and a match with the highest score is selected. A shape of a path may be automatically determined in block 425 based on the best match. While two traces are illustrated, more generally the process may be extended to evaluate multiple traces and select the most likely path.

Figure 5:
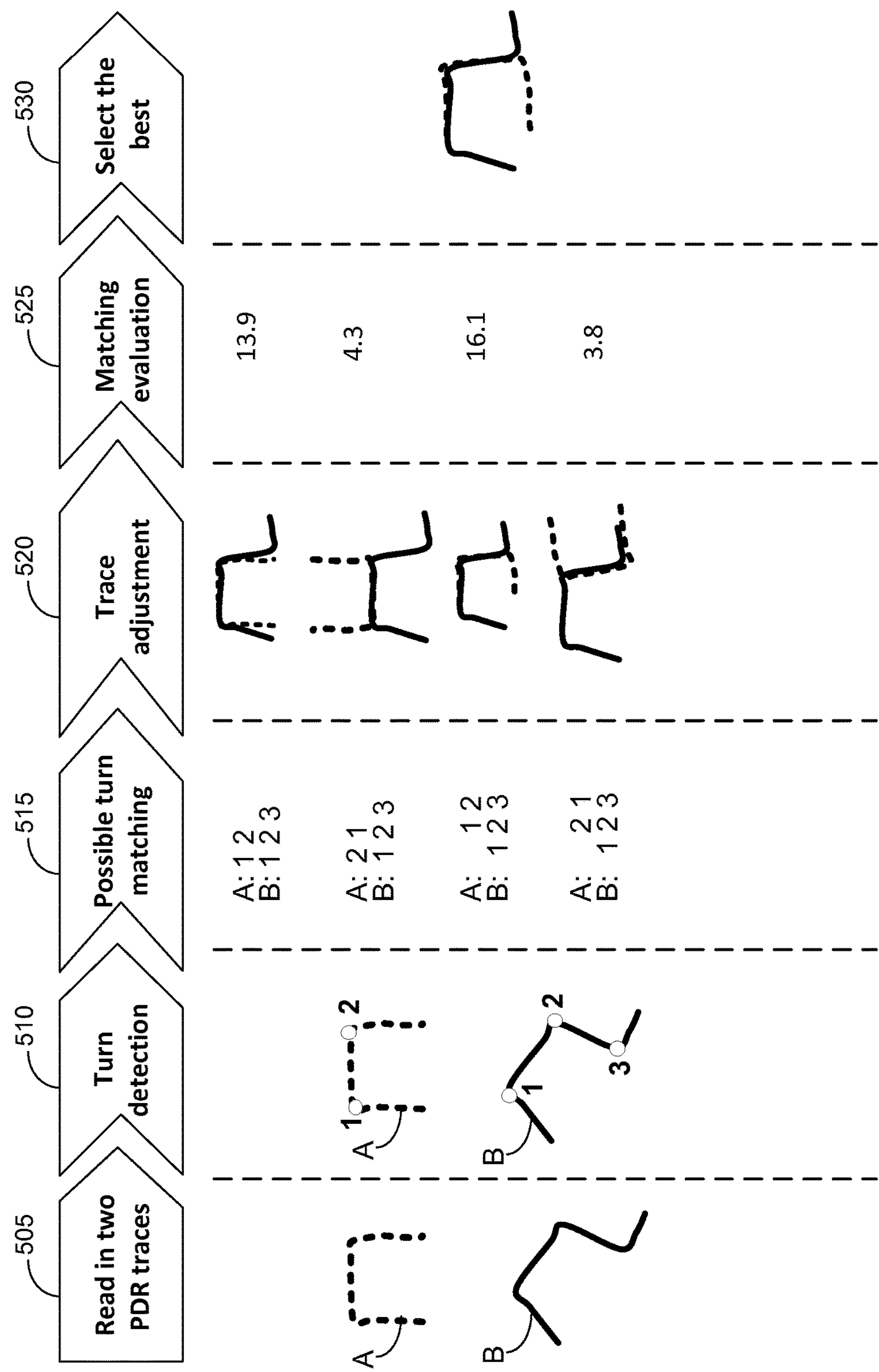
FIG. 5 illustrates a method of automatically determining a path via crowdsourcing in accordance with an embodiment of the present invention.

FIG. 5 is a flow chart illustrating aspects of a method of automatically determining a path via crowdsourcing for the case that the anchor points are turns. Additional illustrative illustrations are provided below each block. In this example, trace data is read in for two traces of trajectory data A and B in block 505. The raw trace data may have sensor errors and offsets. Moreover, the raw trace data may correspond to partially overlapping paths or paths with offset. As a result, the traces A and B have a different shape. In this example, the anchor points are turns and in block 510 turns are detected in the trace data. This results in trace A having detected turns 1 and 2. Trace B has detected turns 1, 2, and 3. This leads to various permutations to be considered in evaluating potential turn matches of the two traces in block 515. In this example there are six possible matches of the turn anchor points. For example turn 1 of trace A may be matched to turn 1 of trace B and turn 2 of trace A matched to turn 2 of trace B, and so on through all of the different possible permutations.

The goal of analyzing the turn matching permutations is to generate all the possible matching of the two trajectories. For example, there are two turns in trajectory A: A1 and A2; and two turns in another trajectory B: B1 and B2. The possible combinations for those turns are:

(A1, B1), (A2,B2)
(A1, B2), (A2,B1)
(A1, NULL), (A2, B1)
(A1, NULL), (A2, B2)
(A2, NULL), (A1, B1)
(A2, NULL), (A1, B2)

Here we assume that at at least one turn match exists and that it is possible to have Null results, where a null result occurs when a turn matches nothing in the other trajectory. In this example, the two traces have a different number of detected turns such that null results occur for some of the possible permutations.

In order to reduce the computation in the future steps, in one embodiment impossible (or more accurately, highly unlikely) combinations are removed based on a signal similarity test for the ambient signals.

In one embodiment the ambient signal is a Wi-Fi signal and impossible (or highly unlikely) combinations are removed by computing a Wi-Fi similarity between two turns. Wi-Fi signals are found at two turns. Given two Wi-Fi scan signals P and Q:

P={ap1:rss1,ap2:rss2,api:rssi, . . . }

Q={ap1:rss1,ap2:rss2,apj:rssj, . . . } then the Tanimoto similarity may be used to calculate the similarity of the two signals as follows:

$$f(P, Q) = \frac{P \cdot Q}{|P|^2 + |Q|^2 - P \cdot Q}$$

If the similarity is larger than a threshold, the two turns may be at the same location (matched). Matches having a similarity smaller than the threshold are unlikely to be valid matches and hence are removed. In the above example, if the Wi-Fi similarity between turn A1 and B1 is smaller than the threshold then all of the combinations containing the match of (A1, B1) will be removed. Thus the final possible combinations after the unlikely combinations are removed will be:

(A1, B2), (A2,B1)
(A1, NULL), (A2, B1)
(A1, NULL), (A2, B2)
(A2, NULL), (A1, B2)

Note that this similarity formula can be applied to other ambient signals and similar threshold test performed to reduce the number of combinations for consideration.

Additional trajectory adjustment (trace adjustment) may be performed based on the turn matching as illustrated in block 520. That is, an adjustment is performed on the two trajectories for a given matching of anchor points. FIG. 5 shows different examples of how the two traces are brought into alignment for a given permutation of anchor points.

A matching evaluation is then performed in blocks 525 and 530 to select the best match. That is, the likelihood of the each trajectory combination is evaluated. In this example, the best match out of the six possible combinations is selected based on a score. In addition to the similarity, other indicators of a best match may be taken into account in picking the best possible combination. An exemplary matching evaluation algorithm is described below in more detail.

It will be understood that the process may be continued for additional traces. After the first two traces are matched, these two traces will be merged as one trace which is used to match other traces.

Figure 6:
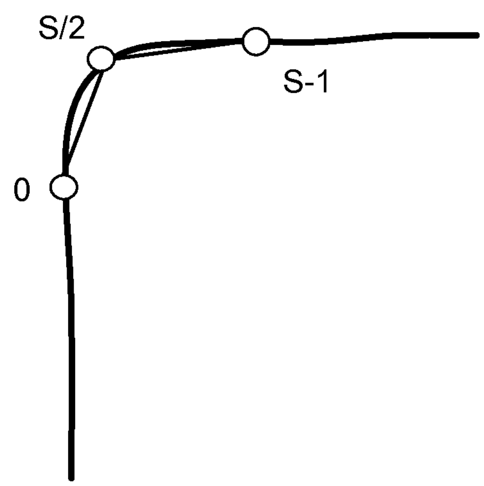
FIG. 6 illustrates aspects of performing turn detection by examining sub-trajectories in steps with a selected length in accordance with an embodiment of the present invention.

FIG. 6 illustrates aspects of turn detection in accordance with an embodiment of the present invention. In one embodiment a sub-trace slide window with a step length, S, is utilized for turn detection. Thus, a single trace is analyzed as a sequence of sub-traces that are considered in a sequence of steps as the slide window is moved. For each sub-trace, a calculation is performed of the angle formed between a first point (at location 0) that is the start of a sub-trace, a middle point of he sub-trace (at location S/2), and an endpoint of the sub-trace point (at location S-1) in a window. In one embodiment a threshold, t, is set for the calculated angle for each sub-trajectory. If an angle is larger than t, the middle point at step S/2 is treated as a potential turning point on the trajectory. If there are continuous sub-trajectories having angles larger than t, then a selection is made of a point S/2 of the sub-trajectory that has the smallest angle as the turning point and ignores all other turning point in those continuous sub-trajectories. The process is continued to examine all sub-trajectories with a certain number of steps S.

Figure 7:
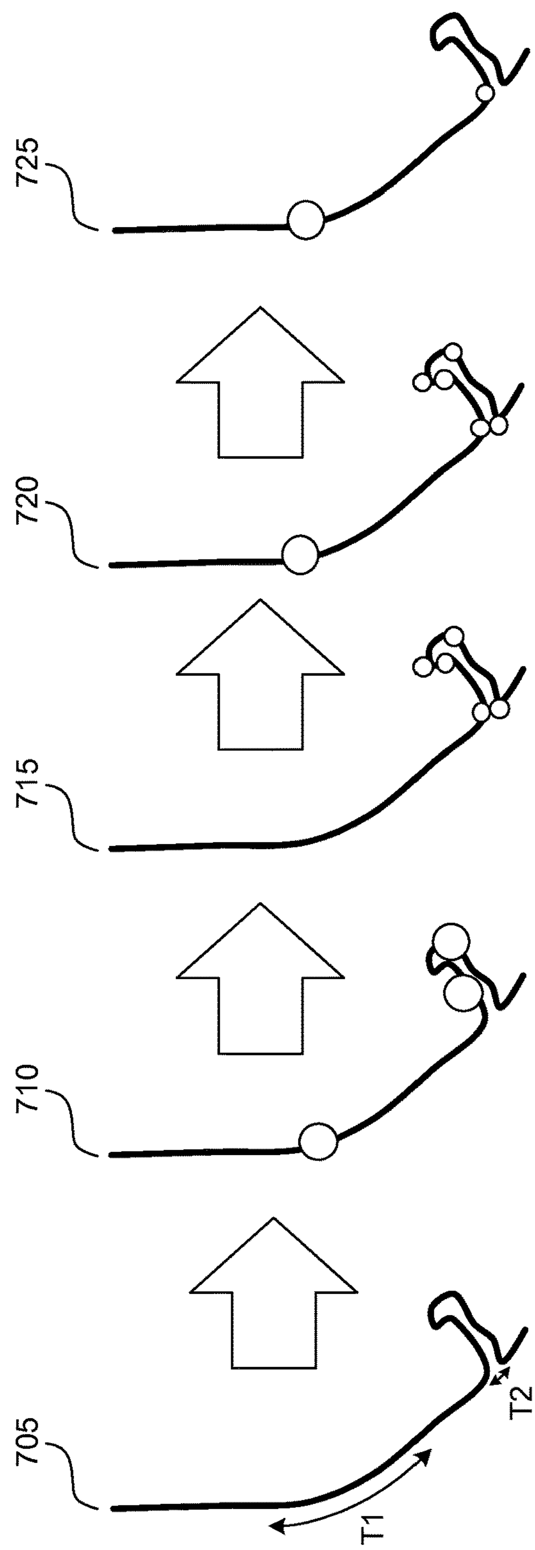
FIG. 7 illustrates adjusting a step length to combine turns in accordance with an embodiment of the present invention.

FIG. 7 illustrates a hybrid approach to optimize detection of mild and sharp turns. As illustrated in FIG. 7, trajectory data may include a combination of mild turns and sharp turns. In trace 705, a mild turn T1 is illustrated along with a localized region T2 having sharp turns. In one embodiment the parameter settings may be selected to select only significant turns. For example, sharp turns may be eliminated by including a rule that if several turns are located proximate each other (such as in region T2), that only the start and end turns are included.

Adjusting the value of the parameter, S, is one way to adjust the ability to detect mild turns and sharp turns. If S is set longer, the detection algorithm can detect the mild turns but cannot accurately detect turns close by (as illustrated in the second plot 710 in FIG. 7). On the other hand, if S is set smaller (as indicated by the smaller point sizes), it can detect very detailed shape turns but may miss the mild turns which normally happen in large indoor space, e.g., shopping mall (as showed in the third plot 715 in FIG. 7).

Plot 720 illustrates a hybrid approach using two different values for parameter S. In a first round of turn detection, a larger value for S is used to detect mild turns in trajectories. In a second round of turn detection, a smaller value for S is used to detect detailed and sharp turns in trajectories. The two turn detection results are then combined to achieve a hybrid result. When combining the two turn detection results, "mild turns" are removed that are near "sharp turns", as showed in the fourth plot 720.

In addition, in one embodiment a selection is made of only one turn from a set of nearby turns as showed in the fifth plot 725. The result in plot 725 is that a number of nearby sharp turns are combined. It will be understood that the parameters for the hybrid approach may be adapted and selected to optimize results for a particular application in order to detect those turns that are significant for identifying a path of interest.

Figure 8:
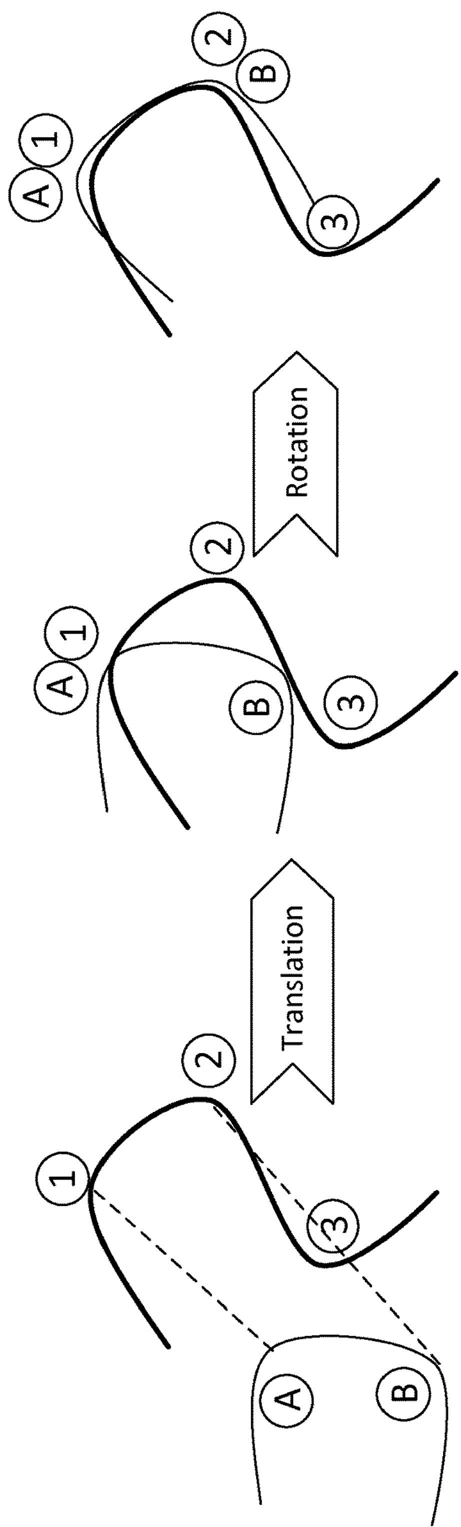
FIG. 8 illustrates trajectory adjustment in accordance with an embodiment of the present invention.

FIG. 8 illustrates additional aspects of trajectory adjustment for a match of two traces. In one embodiment, the trajectory adjustment follows the order of turns on one trajectory and merges the matched turns one by one. For the first matched turns, the turn on one trajectory is translated to the turn on the other. For the following turns, the turns are rotated to coordinates of the new one, which is calculated by averaging the two matched turns. During the turn adjustment, only translation and rotation operations are allowed. It will be understood that variations in the translation and rotation operation are possible to achieve similar results.

Figure 9:
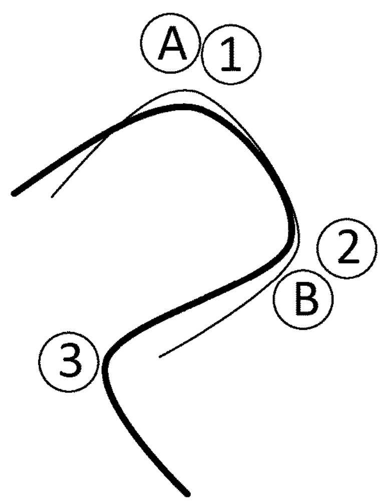
FIG. 9 illustrates aspects of match evaluation in accordance with an embodiment of the present invention.

FIG. 9 illustrates additional aspects of match evaluation. A similarity is calculated for each pair of turns, which for the case of the ambient signal being a Wi-Fi signal is a Wi-Fi similarity. A distance is calculated for each pair of turns. An average score is then calculated for each pair of turns. Thus, in this example, the two traces have turn pairs A1 and B2.

The matching evaluation gives each adjusted trajectory pair a score to indicate the likelihood of the trajectory matching. The evaluation algorithm is based on the observation that if two turns/corners are located at same place, then the Wi-Fi signals (or other ambient signals) associated with the two turns will be very similar. And if the two turns are matched correctly in the trajectories, the distance of two turns in the matching will be small.

Based on above observations, then calculate the score S is calculated:

S=Wi-Fi similarity/turn distance

Given two Wi-Fi scan signals:

A={ap1:rss1,ap2:rss2,api:rssi, . . . }

B={ap1:rss1,ap2:rss2,apj:rssj, . . . }

The the Tanimoto similarity is used to calculate the similarity of the two signals:

$$f(A, B) = \frac{A \cdot B}{|A|^2 + |B|^2 - A \cdot B}$$

A Euclidean distance is used to calculate the turn distance. If two turns have coordinates (x1, y1) and (x2, y2), the turn distance is calculated as:

$d$=sqrt(($x$1−$x$2)^2+($y$1−$y$2)^2)

For nearby turn pairs the result is that if the trajectory adjustment makes the trajectory close to the true (ground value), those turn distances will be smaller. Otherwise the turn distances will be larger. The Wi-Fi similarity for each pair will remain the same. The score is averaged for all nearby turn pairs. Thus, better matching will have a higher score S and worse matching will produce a lower core S. A selection is then made of the match that produces the highest score, S.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

Linked Node Structure

Some of the aforementioned embodiments describe techniques for identifying turns in traces, matching turns and merging trajectories. That is, in various implementations, trajectory data is collected from multiple mobile devices 305. The trajectory data may, for example, reflect the movements of multiple users in indoor or outdoor areas, such as a mall, shopping district, amusement park, etc. Anchor points (e.g., turn points, jumps, speed changes, etc.) are detected in individual traces. Individual crowdsourced paths are matched based on anchor points. The corresponding traces may be translated and rotated with respect to one another based on the matching of anchor points. Examples of the above techniques were discussed above e.g., in connection with FIGS. 3-9.

In various embodiments, a linked node structure is used to represent the matching and merging of multiple traces. A linked node structure is any structure that includes or indicates multiple nodes connected with links. Each node corresponds to a geographical location and/or an anchor point. When a link connects two nodes, in various embodiments it indicates that a user can directly move between the geographical locations corresponding to the two nodes without crossing over any other known node/anchor point. Generally, any suitable software or hardware may be used to generate a linked node structure. In some embodiments, for example, the linked node structure is a data structure that indicates or represents a tree or a tree-like structure with nodes, links and branches, although this is not a requirement and a wide variety of other structures may also be used.

The linked node structure can help streamline the processing of traces and facilitate the use of map and guidance applications based on the merged traces. As additional crowdsourced traces are collected, nodes and links are added to the linked node structure to reflect the newly collected traces. Over time, the linked node structure can represent all known paths between different anchor points/locations based on all crowdsourced traces that have been collected and analyzed up to that point. Because of the way in which the link node structure is arranged, in various embodiments a computer can sometimes more quickly and efficiently obtain useful data (e.g., map data, guidance data, etc.) from the linked node structure than it can from the merged traces themselves.

Figure 10:
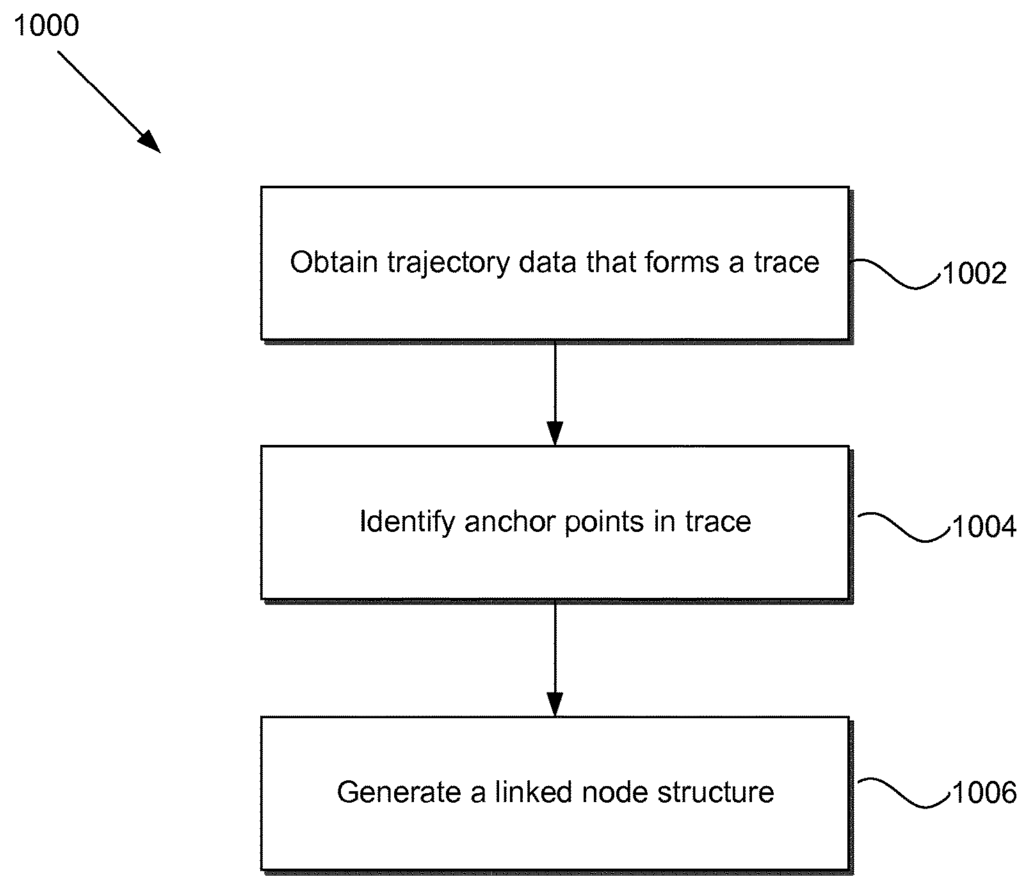
FIG. 10 illustrates a method for generating a linked node structure in accordance with an embodiment of the present invention.

Referring next to FIG. 10, an example method 1000 for generating a linked node structure based on an initial trace will be described. In this example, a server (e.g., the crowdsourcing data gathering and storage unit 330) performs the method 1000, although any suitable computing device may also perform the method. Generally, the device performing the method 1000 has access to multiple crowdsourced traces e.g., trajectory data that the server has received from multiple mobile devices 305.

At step 1002, trajectory data is obtained that forms a trace. This trajectory data may be the trajectory data described above (e.g., trajectory data that is obtained by the mobile devices 305.) The trajectory data may include PDR data, ambient signal data based on ambient signals received by a mobile device 305, or any other data suitable for tracking or identifying changes in the device's location and surroundings over time. In some embodiments, for example, each trace is formed from multiple points and each point is associated with a location (e.g., expressed using x, y coordinates), a timestamp (e.g., indicating when a mobile device 305 arrived at the location) and ambient signal data (e.g., data indicating the strength of signals received from devices at the corresponding location.) Ambient signals can include but are not limited to WiFi signals, Bluetooth signals, ultrasound signals, light-based signals and/or any type of signal, characteristic or parameter detected by the mobile device 305.

Figure 13:
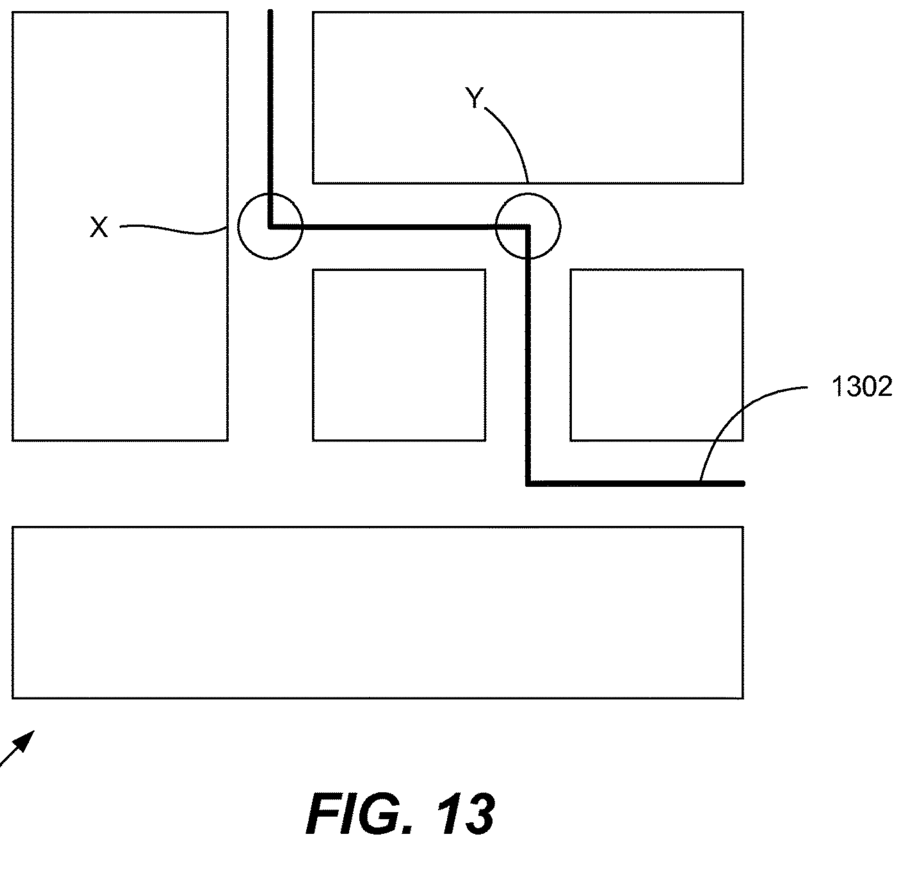
FIG. 13 illustrates a block diagram of a path taken through a shopping mall in accordance with an embodiment of the present invention.
Figure 14:
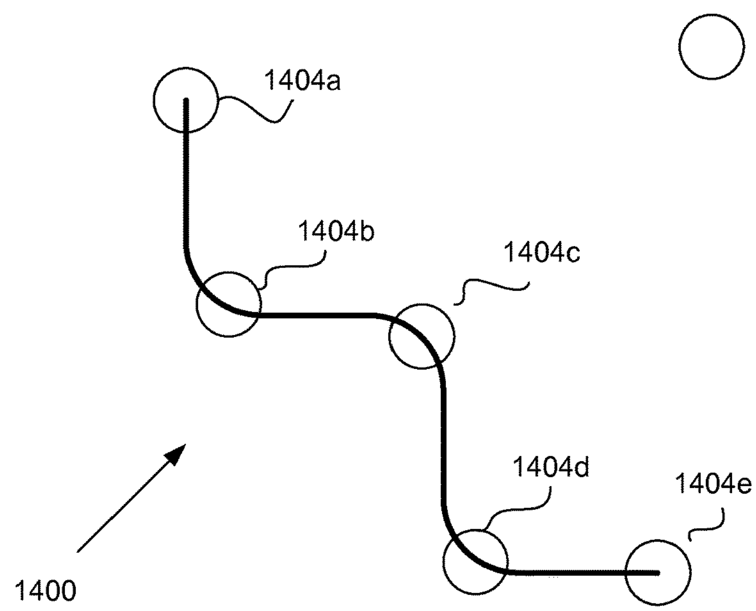
FIG. 14 illustrates a trace with anchor points in accordance with an embodiment of the present invention.

An example of a movement path 1302 and a corresponding trace 1400 is shown in FIGS. 13 and 14. FIG. 13 illustrates an example layout of an indoor location e.g., in this example, a shopping mall 1304. The shopping mall 1304 includes various indoor stores, walls, structures and passageways. FIG. 13 also includes a path 1302 that roughly indicates the movement of a user with a mobile device 305 through the mall. FIG. 14 illustrates a trace 1400 that represents trajectory data collected while the mobile device 305 was traversing the path 1302. In this example, the trace 1400 is based on PDR data and thus is made up of many individual data points that each indicate a particular geographical position that the mobile device 305 was at at different times.

Returning to FIG. 10, at step 1004, anchor points are identified in the trace 1400. Anchor points were described earlier in this application. In some embodiments, an anchor point corresponds to a transition in a characteristic of trajectory data, such as changes in orientation or acceleration e.g., turns, speed changes, jumps, etc. Any of the aforementioned techniques for determining anchor points may be used e.g., as described in connection with step 410 of FIG. 4 and FIGS. 5-7.

FIG. 14 illustrates an example set of anchor points identified in the trace 1400. FIG. 14 includes trace 1400 and anchor points 1404*a*, 1404*b*, 1404*c*, 1404*d* and 1404*e*. In this particular example, each anchor point indicates a part of the trace 1400 in which a turn is detected or when the trace starts and stops. That is, the trace starts at anchor point 1404*a*, stops at anchor point 1404*e*, and includes turns at anchor points 1404*b*, 1404*c* and 1404*d*.

As previously discussed, each anchor point may be associated with a wide variety of additional data. In the illustrated embodiment, for example, each anchor point is associated with trajectory/location data and ambient signal data. The trajectory data indicates a particular geographical location e.g., based on PDR data collected by the mobile device 305. The ambient signal data indicates characteristics of signals (e.g., RF signals, WiFi signals, Bluetooth signals, sensor data, etc.) obtained by the mobile device 305 when it was at the corresponding geographical location. For example, in some embodiments, the ambient signal data indicates the strength of signals (e.g., WiFi, Bluetooth, etc.) received at the mobile device 305 when the mobile device 305 was at the corresponding geographical location. The ambient signal data may also include data indicating the identities of the devices transmitting the signals (e.g., a MAC address of a Bluetooth/WiFi signal transmitting device.) In various implementations, the anchor point data includes a timestamp e.g., a timestamp indicating when a particular mobile device 305 arrived at the anchor point location.

Returning to FIG. 10, at step 1006, a linked node structure is generated based on the anchor points and/or the trace. The linked node structure may be any structure (e.g., a software data structure) that is arranged to help indicate paths or links between geographical locations/anchor points.

Figure 15:
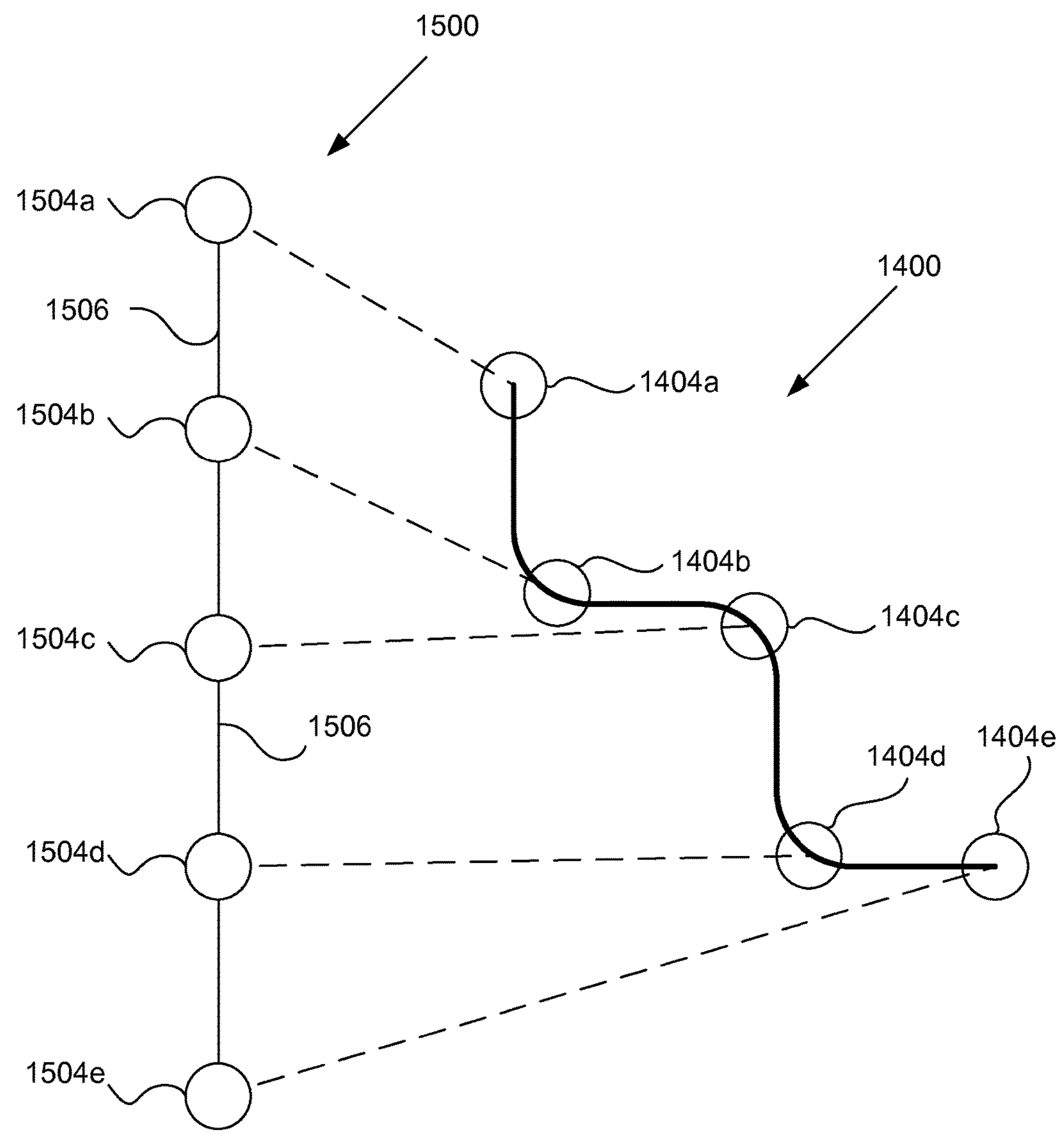
FIG. 15 illustrates a linked node structure and associated trace in accordance with an embodiment of the present invention.

An example linked node structure 1500 is shown in FIG. 15. In this example, the linked node structure 1500 is a tree or tree-like structure, although this is not a requirement. The linked node structure 1500 includes multiple nodes 1504*a*, 1504*b*, 1504*c*, 1504*d* and 1504*e*, which are connected with multiple links 1506. As shown in FIG. 15, each node corresponds to an anchor point of the trace 1400 illustrated in FIG. 14. In this example, each node includes or is associated with all the anchor point data (e.g., trajectory data, ambient signal data, geographical location, timestamp, etc.) that is associated with the corresponding anchor point.

There are a wide variety of ways to construct the linked node structure. In the illustrated embodiment, for example, the following process is used to generate the nodes and links of the linked node structure 1500:

1) obtain the first anchor point in the trace i.e, the anchor point whose corresponding geographical location was visited first by the user/mobile device that helped formed the trace;

2) generate a node based on the first anchor point. This node is the first node (root) of the linked node structure;

3) Examine the trace to see if there are other anchor points in the trace that have not been accounted for in the linked node structure. If there are no more anchor points in the trace, then the linked node structure has been finished;

4) If there are still one or more anchor points that have not been accounted for in the linked node structure, move to the next anchor point in the order that they were visited by the user/mobile device;

4) generate a node based on the next anchor point; create a link between this node and the previously created node.

5) go back to step 3) above.

In the example illustrated in FIG. 15, the above process resulted in the linked node structure 1500. The linked node structure includes nodes 1504*a*-1504*e*, which correspond to the anchor points 1404*a*-1404*e* of FIG. 14, respectively. Each node is associated with or includes the data (e.g., trajectory data, ambient signal data, geographical location, etc.) that is associated with its corresponding anchor point.

In the illustrated embodiment, each link between two nodes indicates that there is a direct path between the geographical locations associated with the nodes. For example, assume that node 1504*b* represents location X and node 1504*c* represents location Y. The link between the nodes indicates that a user can move between locations X and Y without encountering any of the characteristics, locations and/or signals that are the basis for determining an anchor point. In the illustrated embodiment, for example, the anchor points represent turns in the movement path of the mobile device. Thus, the link between nodes 1504*b* and 1504*c* means that a user can traverse between locations X and Y without having to turn and/or substantially change direction. (This can also be seen in FIG. 13, which indicates that a straight passage connects locations X and Y.)

It should be appreciated that the linked node structure does not need to literally include or involve distinct links and nodes. Any suitable data or structure (e.g., software or hardware-based data structure) that is based on but distinct from the trace (e.g., raw PDR data or ambient signal data) and that helps indicate at least some of the features of the aforementioned linked node structure may also be used.

Generally, each node includes or is associated with node data. As previously noted, each node is generated based on an anchor point, and thus the node data is the same as or based on the data that was associated with the corresponding anchor point. In various embodiments, each node is thus associated with trajectory/location data (e.g., PDR data or any other data that helps indicate a geographical location), ambient signal data (e.g., the strength of ambient signals received at the location) and/or a timestamp (e.g., indicating when a mobile device 305 arrived at the geographical location.) Additionally, the node data may include any other suitable parameters and values. In some implementations, for example, the node data also includes a passthrough value, which indicates how many paths or traces have passed through the geographical location associated with the node. In the example illustrated in FIG. 15, since the linked node structure 1500 has been generated based on a single trace, each of the nodes 1504*a*-1504*e* has a passthrough value of one.

Once a linked node structure is formed based on a selected trace, additional traces are analyzed. Some of these traces and the linked node structure may involve the same general geographical area (e.g., the shopping mall 1304 of FIG. 13), although they have different physical start and end points. Overlapping traces can then be merged to create a model of the geographical area. The linked node structure is adjusted to take into account the merged traces and their respective anchor points. Thus, in various implementations, the linked node structure reflects the routing and navigational information obtained from multiple traces that overlap in a particular geographical area. An example of this process is described in FIG. 11.

Figure 11:
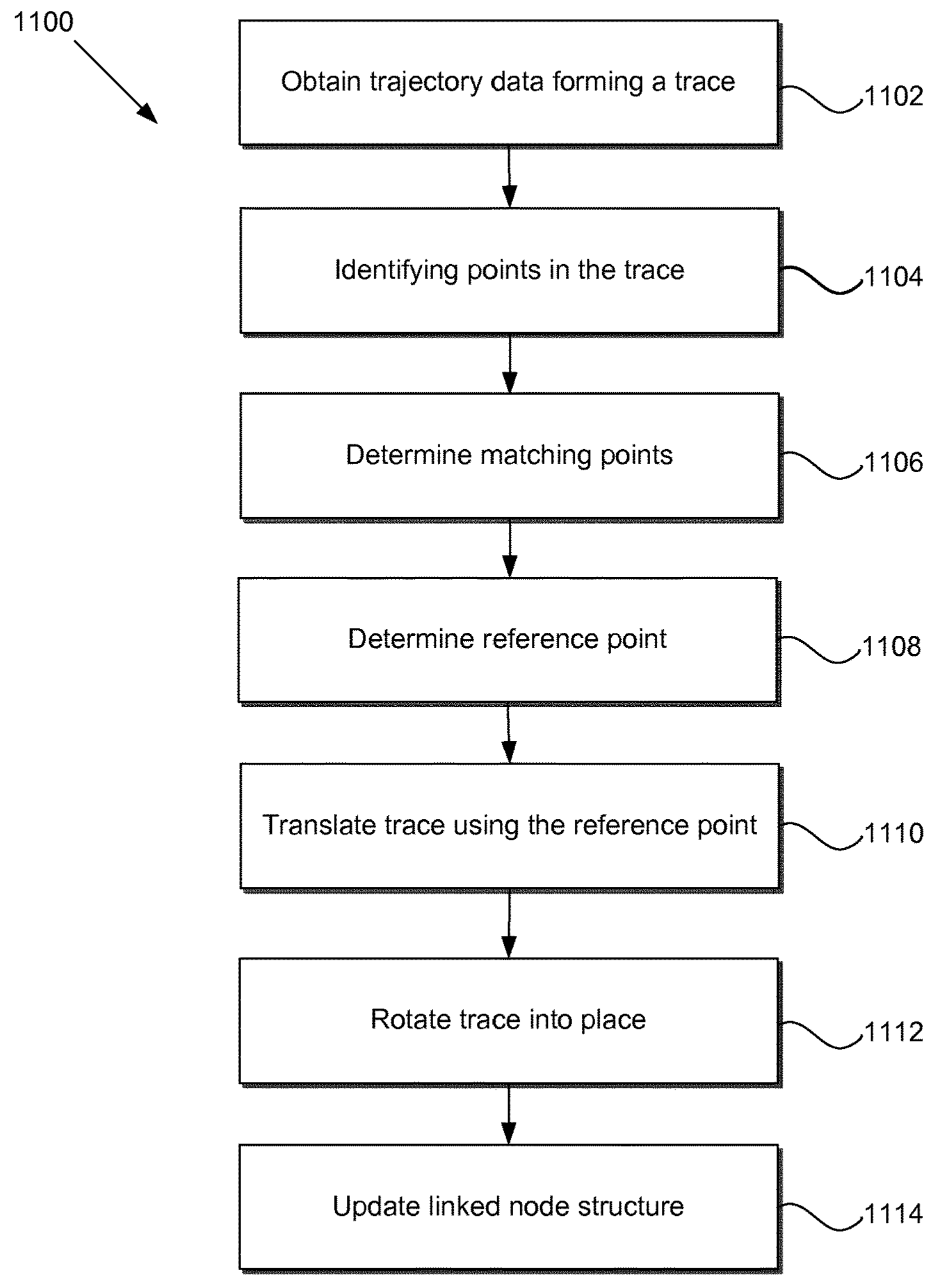
FIG. 11 illustrates a method for updating a linked node structure in accordance with an embodiment of the present invention.

FIG. 11 is a flow diagram of an example method 1100 for merging traces using a linked node structure. The method 1100 assumes that a linked node structure has already been formed (e.g., as described in method 1000 of FIG. 10.) In this example, any suitable server (e.g., the crowdsourcing data gathering and storage unit 330) performs the method 1100, although any suitable computing device may also perform the method. Generally, the device performing the method 1100 has access to multiple crowdsourced traces e.g., trajectory data that has been received from many mobile devices 305.

At step 1102, trajectory data is obtained for a new trace. This trace, for example, may be one of many traces based on crowdsourced trajectory data that has been collected by multiple mobile devices 305, as previously discussed.

Figure 16:
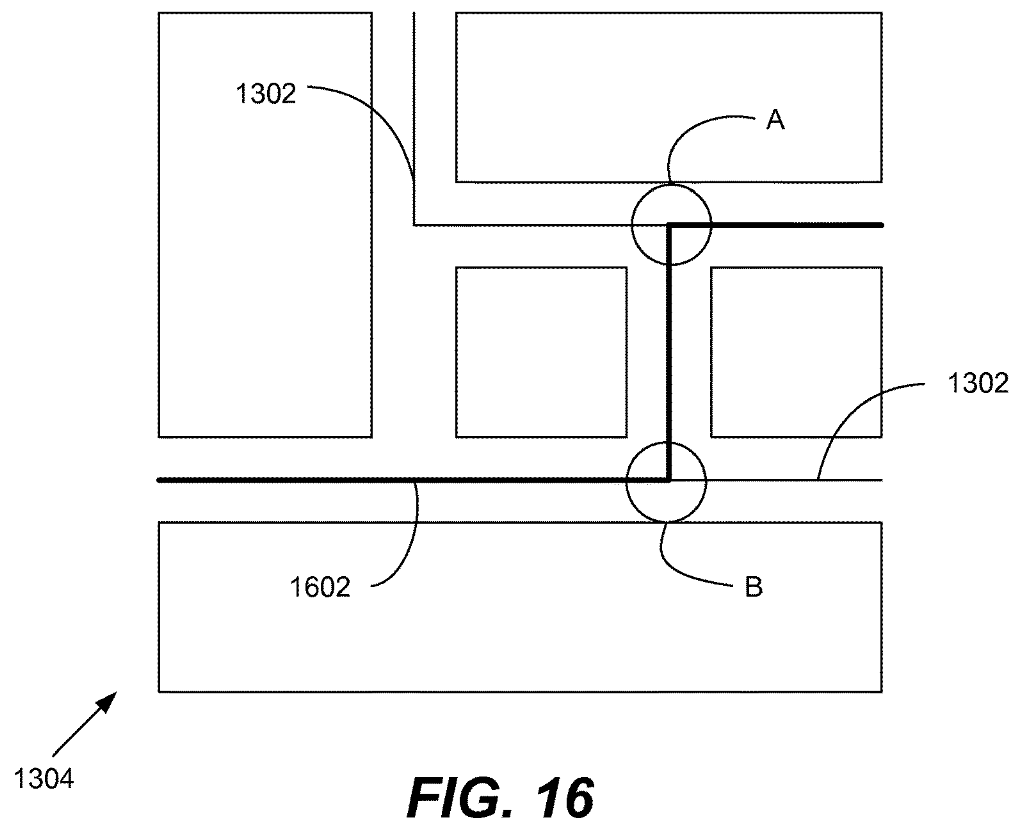
FIG. 16 illustrates a block diagram of paths taken through a shopping mall in accordance with an embodiment of the present invention.
Figure 17:
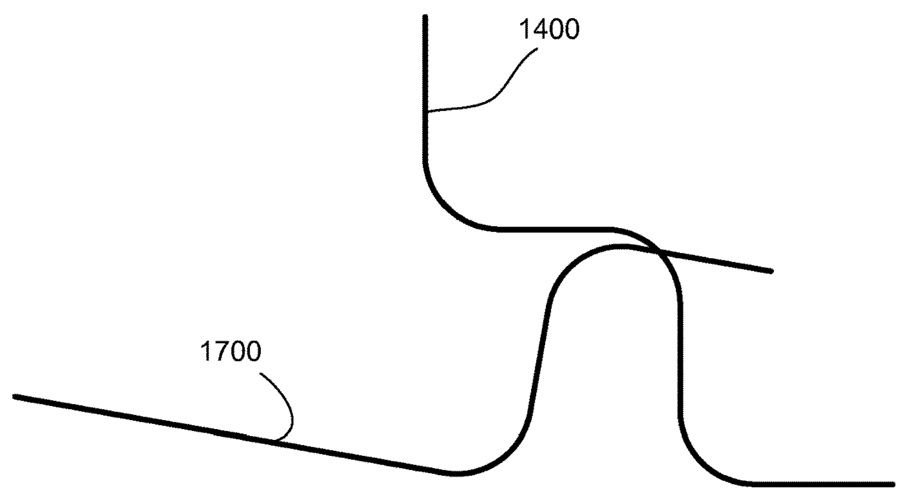
FIG. 17 illustrates two traces in accordance with an embodiment of the present invention.

An example implementation of step 1102 is shown in FIGS. 16 and 17. FIG. 16 again shows the shopping mall 1304 illustrated in FIG. 13. The movement path 1302 illustrated in FIG. 13 is also shown in FIG. 16 as a thin line. The thicker line roughly represents another path 1602 taken by another user and a different mobile device in the same mall. (It should be noted that the path 1602 could also have been traversed by the same mobile device that followed path 1302.) The movement paths 1302 and 1602 overlap to some degree.

FIG. 17 illustrates the trace 1700 that is based on trajectory data collected by a mobile device 305 while it was traversing the path 1602. In FIG. 17, trace 1400 of FIG. 14 and trace 1700 are plotted in the same coordinate system. From FIG. 16, it can be seen that ideally the traces 1400 and 1700 should substantially overlap, as they are based on movement paths 1302/1602 that cross over one another. However, due to sensor/gyro noise and other errors in the trajectory data, the traces are somewhat offset from one another and are misaligned. This will be corrected in later steps using a linked node structure.

Figure 18:
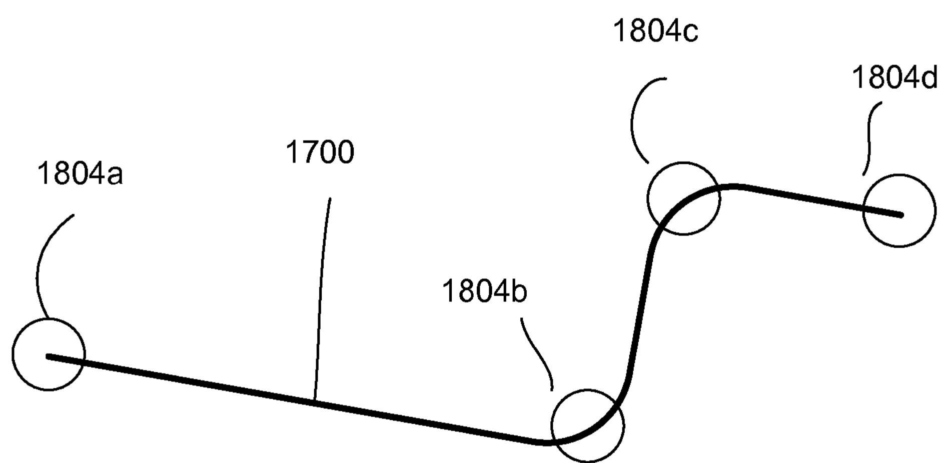
FIG. 18 illustrates a trace with anchor points in accordance with an embodiment of the present invention.

Returning to FIG. 11, at step 1104, anchor points are identified in the new trace. The identification or determination of anchor points may be performed using any of the aforementioned techniques (e.g., as described in connection with step 410 of FIG. 4, FIGS. 5-7 and step 1004 of FIG. 10.) An example implementation of this step is shown in FIG. 18, which illustrates multiple anchor points 1804*a*, 1804*b*, 1804*c* and 1804*d* identified in trace 1700. Again, in this example, each anchor point indicates a beginning of tracked movement, an end to tracked movement, or a turn (i.e., a change in direction), although in other embodiments anchor points may be determined based on different features.

At step 1106 of FIG. 11, matching points are found. More specifically, a determination is made as to whether any of the nodes of the linked node structure and the anchor points of the new trace match. As previously discussed, each node of the linked node structure is associated with various types of data e.g., trajectory data and ambient signal data. This data helps indicate a geographical location that the node corresponds to. Each of the anchor points of the new trace is also associated with such data and a geographical location. A determination is made as to whether any of the nodes of the linked node structure correspond to the same geographical locations as any of the anchor points.

The matching process may be performed in any suitable manner. In some embodiments, for example, the ambient signal data (e.g., the signal strength data of signals received from various devices, such as WiFi access points or Bluetooth signal transmitting devices) for each node and anchor point is analyzed to determine whether the node and anchor point match. Some implementations involve determining a Tanimoto similarity between the ambient signal data for each node and anchor point (e.g., as discussed earlier in this application.) If the Tanimoto similarity is substantial enough and/or exceeds a predefined threshold, it is determined that the node and the anchor point match.

Additionally, any of the techniques previously discussed in connection with FIGS. 4 and 5 (e.g., steps 410, 415 and 420 of FIG. 4 and blocks 510 and 515 of FIG. 5) may be used to determine matches between anchor points and nodes. Some of the aforementioned techniques are used to match anchor points in one trace with anchor points in another trace. More specifically, some of these techniques use data associated with the anchor points (e.g., ambient signal data) to match anchor points for different traces. In various embodiments, the same techniques are used to determine a match between each node of a linked node structure and each anchor point of a new trace, since generally nodes and anchor points are associated with the same or similar types of data (e.g., ambient signal data, location/trajectory data, etc.).

Figure 19:
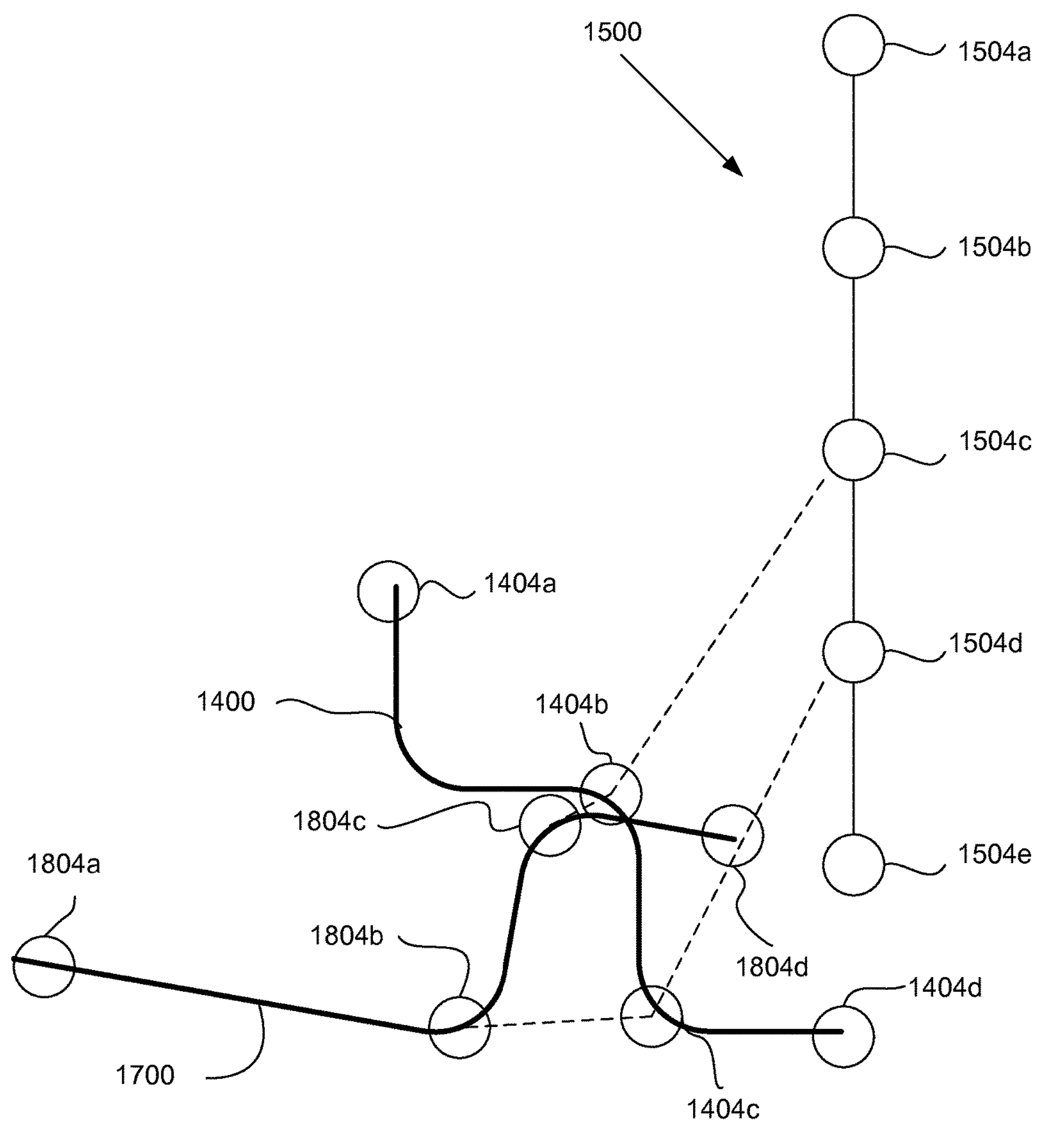
FIG. 19 illustrates matching of points in traces and a linked node structure in accordance with an embodiment of the present invention.

An example implementation of step 1106, which involves matching nodes of a linked node structure with anchor points of a new trace, is illustrated in FIG. 19. FIG. 19 indicates that matches were found between nodes 1504*c* and 1504*d* of the linked node structure and anchor points 1804*c* and 1804*b* of the new trace 1700, respectively. The nodes 1504*c* and 1504*d* correspond to anchor points 1404*b* and 1404*c* on the initial trace 1400 (also illustrated in FIG. 19), which the linked node structure 1500 was based on. Thus, the matching indicates that anchor point 1404*b* of trace 1400, anchor point 1804*c* of trace 1700 and node 1504*c* are associated with the same geographical location A of FIG. 16. The matching also indicates that anchor point 1404*c* of trace 1400, anchor point 1804*b* of trace 1700 and node 1504*d* are associated with the same geographical location B of FIG. 16.

Returning to FIG. 11, once the matching points (i.e., matching nodes and anchor points) have been determined, a reference point is determined. The reference point is selected from among the matching points. It is generally understood as being the matching point that has the highest accuracy i.e., has the highest likelihood of having associated data (e.g., ambient signal data, location data, PDR data, etc.) that is accurate.

The selection of one of the matching points as a reference point can be performed in a variety of ways. In some embodiments, for example, it is desirable to select the matching point that was visited earliest by a user. That is, as previously described, each node or anchor point is based on a trace, which in turn was generated by trajectory data obtained by a mobile device. Generally, the trajectory data indicates the order in which various anchor points were visited by the user and his or her device as the device traversed the path of the trace. In some embodiments, the reference point is the matching point that the device arrived at first relative to the times that the device arrived at the other matching points. Put another way, in some implementations, this means that the matching point is the point that is closest to the root of the linked node structure, since the root node was based on the anchor point in a trace that was arrived at first by a device user. A possible rationale for this approach is that some types of tracking and PDR-related technologies are more accurate when the user starts along the path for the trace, but then degrade in accuracy over time due to sensor noise and other tracking errors. However, it should be appreciated that any suitable technique may be used to determine the accuracy of the matching points and to select a reference point among them.

An example implementation of step 1108 is illustrated in FIG. 19. In this example, node 1504*c* and anchor point 1804*c* are determined to match and thus collectively form a matching point. Node 1504*d* and anchor point 1804*d* are also determined to match and also collectively form another matching point. It is determined that node 1504*c*/anchor point 1804*c* is the reference point, in part because node 1504*c* is closest to the root node (node 1504*a*) of the linked node structure 1500 relative to the other matching points, thus indicating that it was visited earlier by a user who followed the path 1302 that the linked node structure 1500 is based on.

Returning to FIG. 11, once a reference point is selected, the new trace is translated using the reference point (step 1110). That is, the reference point can be used to determine a suitable location at which the new trace and the linked node structure should be connected. The linked node structure is modified to take into account the connecting of the new trace.

In various implementations, one or more nodes and links are added to the linked node structure to account for the new trace. This may be performed in a variety of ways, depending on the nature of the linked node structure and the needs of different applications. In some embodiments, for example, the following process may be followed to add nodes to a linked node structure:

1) Start at the reference point (i.e., the anchor point on the new trace and the node on the linked node structure that correspond to the reference point.)

2) Add a node to the linked node structure to account for an anchor point that is not yet represented in the linked node structure and that connects directly to the reference point in the new trace. The data associated with the anchor point is included in or associated with the new node.

3) For every anchor point in the new trace that is unrepresented in the linked node structure, add a node to the linked node structure. The data for the new node is the same as or is based on the anchor point data, as described above. Create links between nodes as appropriate to indicate direct connections between anchor points in the trace.

4) Continue the above process until all anchor points in the trace are accounted for the linked node structure.

Figure 20:
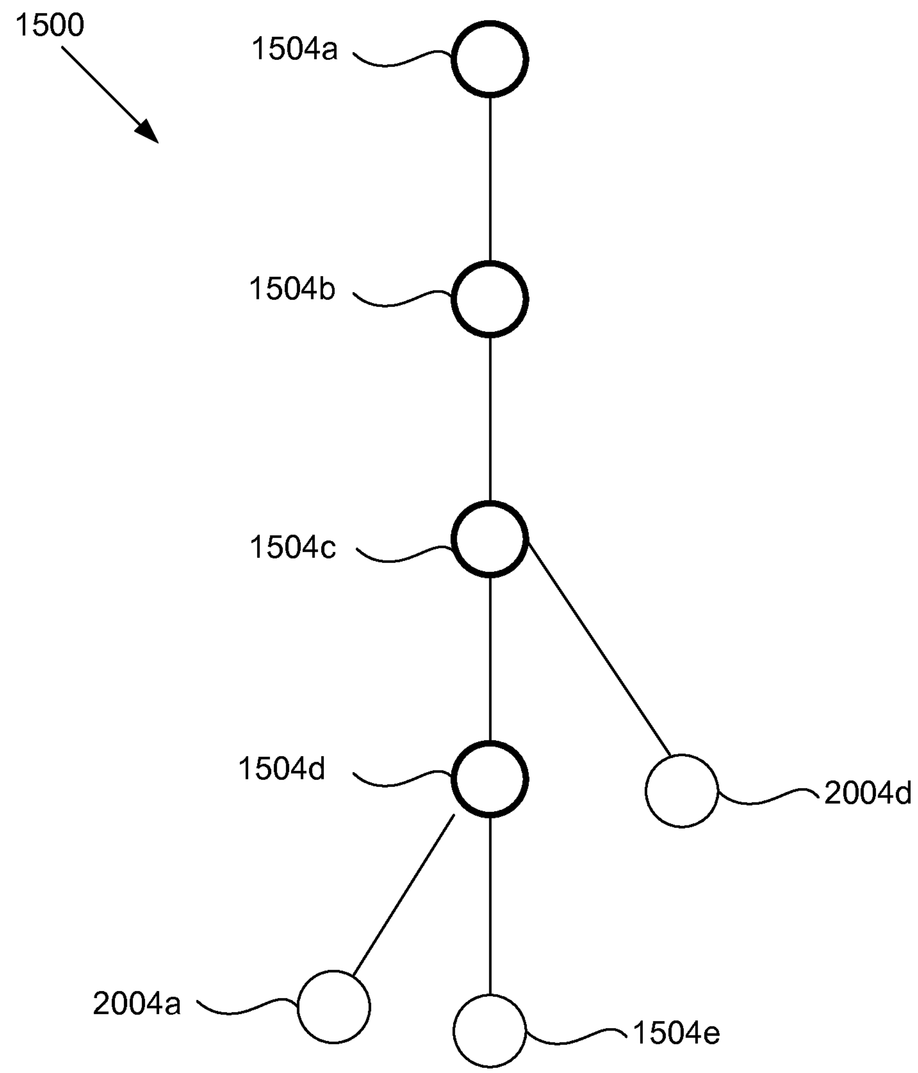
FIG. 20 illustrates a modified linked node structure in accordance with an embodiment of the present invention.

An example implementation is illustrated in FIG. 20. In FIG. 20, the original link node structure is represented by nodes 1504*a*-1504*d*. The reference point 2002 corresponds to node 1504*c* and anchor point 1804*c* of new trace 1700 (FIG. 19). Since anchor point 1804*d* is directly connected to anchor point 1804*c* on trace 1700, a node 2004*d* is added and linked to node 1504*c*. Node 2004*d* is associated with or includes the data of anchor point 1804*d*. Anchor point 1804*b* is also directly connected to anchor point 1804*c*, but is already properly accounted for by node 1504*d* in the linked node structure, as node 1504*d* directly links to node 1504*c*. The remaining anchor point on trace 1700 that is unrepresented in the linked node structure 1500 is anchor point 1804*a*. Anchor point 1804*a* links directly to anchor point 1804*b*, which matches node 1504*d* on the linked node structure 1500. Thus, a new node is created (node 2004*a*) and is linked directly to node 1504*d*. The node 2004*a* is associated with or includes the data for anchor point 1804*a*

Figure 21:
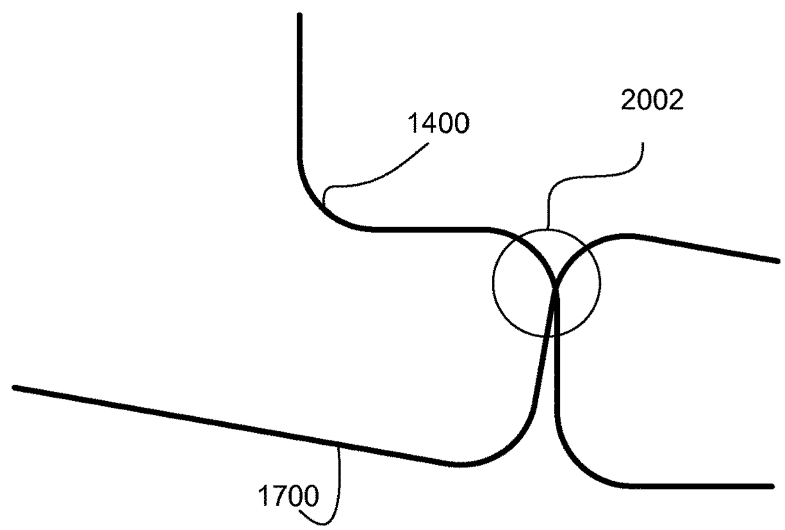
FIG. 21 illustrates merging two traces in accordance with an embodiment of the present invention.

The traces can also be arranged based on the above translation process. That is, the trace(s) that the linked node structure is/are based on and the new trace can be connected at the reference point. An example implementation of this approach is illustrated in FIG. 21. It should be recalled that in FIG. 17, based on the associated trajectory data alone, the traces 1400 and 1700 were erroneously offset from one another. To help correct this error, the trace 1700 is arranged so that it connects with trace 1400 at reference point 2002 (i.e., the location associated with node 1504*c*/anchor point 1404*b* of FIG. 19), as indicated in FIG. 20. The new trace 1700 connects to the reference point 2002 at the location of anchor point 1804*c* (i.e. the matching point on the trace 1700 that matches with anchor point 1404*b*/node 1504*c* in FIG. 19.) That is, the location data associated with anchor point 1804*c* is modified to match the location data associated with node 1504*c*.

Returning to FIG. 11, at step 1112, the new trace is then rotated into place based on other known matching points. This may be performed in any suitable manner. In some implementations, for example, this step involves calculating the location of the non-reference matching points on the new trace and repositioning the trace accordingly. By way of example, a position of a non-reference matching point on the new trace can be determined by taking the average of the positions of the corresponding matching points on the linked node structure and the new trace. This helps improve the accuracy of the trace.

An example implementation of this approach is described with reference to FIG. 19. The non-reference matching point for the trace 1700 is the anchor point 1804*b*. The corresponding matching point for the linked node structure 1500 is 1504*d*. As previously noted, each node is associated with node data and each anchor point is associated with anchor point data, which both include, for example, trajectory/location data, such as PDR data. Assume for the purpose of this example that the PDR data for the node 1504*d* is associated with the location X1 and that the PDR data for the anchor point 1804*b* is associated with the location Y1. In this example, the new location for the location of the anchor point 1804*b* is the average of X1 and Y1. If there were additional non-reference matching points, their locations could be determined in a similar manner.

Figure 22:
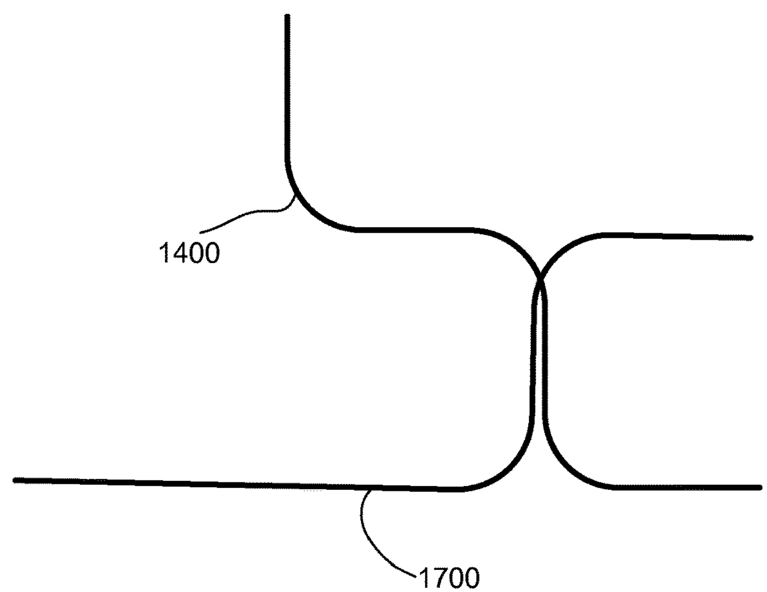
FIG. 22 illustrates rotating a trace in accordance with an embodiment of the present invention.

Once the locations of the non-reference matching points on the trace are determined, the traces can be realigned and/or rotated based on the newly determined locations. An example implementation of this operation is illustrated in FIG. 21. In FIG. 21, the traces 1400/1700, although connected at the reference point 2002, are misaligned. Based on the recalculated position of the non reference matching points on the trace 1700 (e.g., anchor point 1804*b*), the trace 1700 is rotated into place, as shown in FIG. 22. The merged traces now much better resemble the actual paths 1302/1602 taken by users through the mall 1304, which the traces 1400/1700 are intended to represent, as shown by comparing FIGS. 16 and 22.

Additionally, other adjustments may be made to the new trace in order to improve its accuracy. In some embodiments, for example, ambient signal data is used to modify the trace. As previously noted, in various implementations each anchor point and node is associated with location data and ambient signal data (e.g., WiFi data, Bluetooth data, etc.) Additionally, the trace may be made of multiple points (e.g, using PDR), each point being associated with a timestamp, ambient signal data and location data. In some embodiments, the estimated location of points in the trace is modified based on an analysis of the ambient signal data for each point and the ambient signal data for one or more of the nodes. If, for example, the ambient signal data for a node (e.g., a WiFi fingerprint) is the same as that of a point in the trace, in some applications it is desirable to adjust the point location so that the point and the node are associated with the same location.

At step 1114 of FIG. 11, the data for the linked node structure is updated. As discussed, in various embodiments, each new node added to the linked node structure is based on an anchor point on the new trace, and is thus associated with the same data as the corresponding anchor point (e.g., ambient signal data, PDR data, location data, timestamp data, etc.) Such data can be stored at the linked node structure or in any other suitable manner.

In various implementations, the node data corresponding to matching points on the linked node structure is also modified. This can be done in a variety of ways. Consider an example in which a new trace has an anchor point A that is associated with data A. The anchor point A matches with a node B on a linked node structure. Node B is associated with data B. In this example, data A and data B involve location/PDR data (e.g., data indicating a location associated with the node/anchor point, expressed in the form of x, y coordinates) and ambient signal data (e.g., data indicating the strength of signals received at various locations from signal transmitting devices, such as Bluetooth signal transmitting devices, WiFi access points, or any other source of ambient signals.)

In various embodiments, data for matching node A can be updated by averaging the values in data A and data B e.g., as discussed in connection with step 1112 of FIG. 11. For example, data A may include PDR data that associates anchor point A with position P1. Data B may include PDR data that associates node B with position P2. Data B can then be updated to associate node B with a position based on the average of P1 and P2. Ambient signal data may be averaged as well e.g., if data A associates anchor point A with a signal strength value Y1 from a particular signal transmitting device, and data B associates node B with a signal strength Y2 from the same signal transmitting device, then data B can be updated to indicate that the strength of the signal received from that same device is the average of Y1 and Y2. It should be appreciated, however, that the updating of the node data can be performed in any suitable manner, and is not limited to the above averaging techniques.

Other parameters and values in the node data may be updated as well. In various embodiments, for example, the node data of each node includes a passthrough value. As previously discussed, the passthrough value indicates the number of paths or traces that have passed through the node. Generally, since the matching points indicate that a new trace has passed through the matching point nodes, the passthrough values of those nodes are increased by one. Thus, in the example of FIG. 22, each node has a passthrough value of 1, except for the matching points (nodes 1504*c* and 1504*d*), which each have a passthrough value of 2. This is because at least two traces (e.g., traces 1400 and 1700) pass through locations associated with those nodes, as shown in FIGS. 16 and 19.

Figure 12:
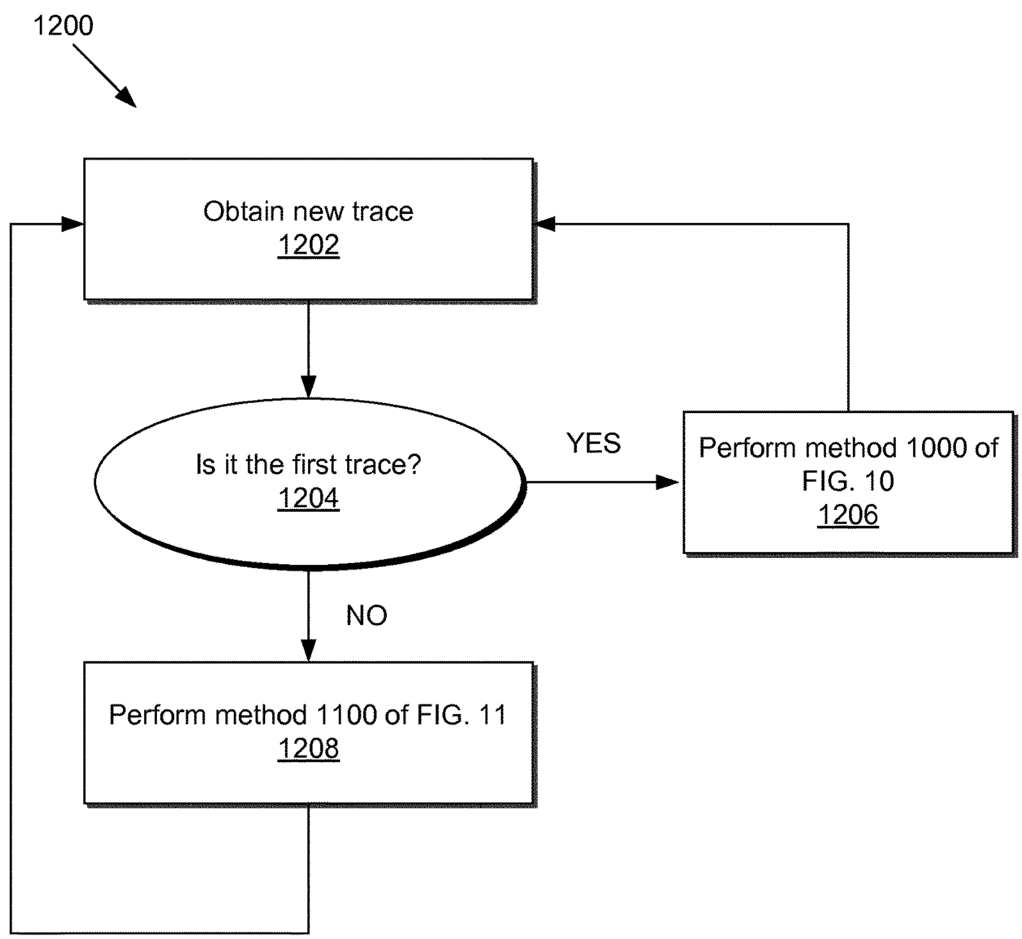
FIG. 12 illustrates a method for generating and updating a linked node structure in accordance with an embodiment of the present invention.

Once a linked node structure has been created using an initial trace, it can then be updated and added to repeatedly with new crowdsourced traces using the above method 1100 of FIG. 11. An example of this process is illustrated in FIG. 12. FIG. 12 illustrates a method 1200, which in this example is implemented by a server (e.g., the crowdsourcing data gathering and storage unit 330), although any suitable computing device may perform method 1200. Initially, at step 1202, a trace is obtained. For example, the trace may be crowdsourced from a mobile device 305 that transmitted the trace to the server.

At step 1204, a determination is made as to whether the trace obtained in step 1202 is the first trace obtained for a particular geographical area. That is, a determination is made as to whether a suitable linked node structure for the geographical area (e.g., the shopping mall 1304 of FIG. 13) associated with the new trace has not yet been generated. If the answer is yes, the method 1200 proceeds to step 1206. At step 1206, a linked node structure is generated based on the trace, as discussed in connection with method 1000 of FIG. 10.

If a determination is made that the trace obtained in step 1202 is not the first trace and/or that a suitable linked node structure has already been generated, then the method 1200 proceeds to step 1208. At step 1208, as discussed above, method 1100 of FIG. 11 is performed. During this step, an existing linked node structure is updated to take into account the new trace. Also, the trace may be merged and suitably aligned with an existing set of merged traces, which are represented by the linked node structure. Once the new trace has been added, the method 1200 proceeds back to step 1202 and the method is repeated.

Over time, the linked node structure is repeatedly updated to reflect additional crowdsourced traces. Once a sufficient number of traces are obtained, the linked node structure indicates a variety of routes that people can take to navigate a particular geographical region. The linked node structure in FIG. 20, for example, indicates how a person could navigate the shopping mall 1304 of FIGS. 13 and 16. It indicates locations that a person could move between without encountering a turn or another anchor point. It also indicates how many times a particular person or device has traversed through a particular anchor point (e.g., using the passthrough values.)

Based on the above data, a variety of useful services can be provided. In some embodiments, a server that has performed method 1200 of FIG. 12 then provides a service to a mobile device user. By way of example, the server can send data to the mobile device 305, which gives guidance on the shortest path to a particular target location in the area covered by the linked node structure. The mobile device 305 then displays a message, guidance and/or a graphical interface based on the data. In some embodiments, the server can also send distance data to the mobile device 305, which indicates the distance between the current location (or another location) and a target location. The distance can be calculated based on the node data for those nodes that are associated with those locations. That is, since each node is associated with location data, the physical distance between each pair of linked nodes can be determined, and thus the total distance of a path that passes through multiple linked nodes can be determined as well.

The linked node structure can also be used to identify real time traffic patterns and the movement and activity patterns of users. That is, as mobile devices 305 are traversing a particular area, they are arranged to transmit trajectory data and trace information to a server. The server then performs the method 1200 of FIG. 12 in real time as the trajectory data is received. Thus, a linked node structure is generated and updated in real time based on the received trajectory data, and reflects the current traffic patterns in the area. The linked node structure can be used, for example, to determine crowding data i.e., data indicating how many people have passed through one or more locations (e.g, anchor point locations.) By way of example, the passthrough values for each node can be used to determine crowding data.

Once such crowding data is obtained, it can be used for a variety of applications. By way of example, the server could transmit crowding data to a mobile device 305, indicating how crowded various parts of a particular area are and/or the most popular paths from one location to another. The crowding data is based on the links, nodes and/or passthrough values of a linked node structure stored at the server. In various implementations, the crowding data indicates traffic patterns over a variety of time periods, including but not limited to current, daily, monthly or seasonal traffic patterns. Based on the crowding data received from the server, the mobile device 305 is arranged to display a map, graphical interface or other type of message to a user, indicating such crowding patterns and/or a route for avoiding or approaching crowded areas. In some embodiments, the crowding patterns are used to determine how much should be charged for a particular ad placed at a location in the area. Ad rates for highly trafficked areas could be set higher, for example, than ad rates for areas with less traffic. A similar approach can be used for leasing rates e.g., a leasing rate for a building in a mall that is determined to be in a high-traffic area may have a higher rate.

In some applications, the aforementioned server can transmit data to a mobile device 305 or other device, indicating how quickly people are traversing through turns e.g., nodes. The transit time can also be based on location and time data associated with the nodes. In various implementations, for example, the node data for each node includes position data (e.g., x, y coordinates) and time data (e.g., the time at which those coordinates were arrived at by a particular mobile device 305.) Other nodes that the same mobile device arrived at can be associated with similar types of position and time data. Thus, based on such data, the time needed for the mobile device 305 to move between any two nodes or through a series of nodes can be calculated. In various implementations, the server transmits such time data to a mobile device 305, which then displays a message indicating estimated travel times between different locations.

What is claimed is:

1. A computer implemented method, comprising:

receiving, by a computer, collected trajectory data from a plurality of mobile devices on a plurality of crowdsourced paths, wherein the trajectory data for each path of the plurality of crowdsourced paths has associated therewith an ambient signal;

processing, by the computer, the collected trajectory data by:

identifying, by the computer, a set of anchor points in the trajectory data for each path of the plurality of crowdsourced paths respectively, generating a set of permutations of each set of anchor points from each path of the plurality of crowdsourced paths respectively, and selecting, by the computer, a best match of paths among the plurality of crowdsourced paths, the best match of paths selected at least partially based on (a) evaluating the set of permutations of each set of anchor points from each path to provide best matching sets of anchor points and (b) determining a signal similarity score between the associated ambient signal for each path of the plurality of crowdsourced paths respectively;

generating, by the computer, a shape of a path in a geographic area based on the best match of paths and providing a linked-node structure corresponding to a path map of the geographical area; and storing the shape of the path in the geographic area and the linked-node structure in a memory accessible by the computer.

2. The method of claim 1, wherein, for each path of the plurality of crowdsourced paths, each anchor point in each identified set of anchor points corresponds to a transition in a characteristic of the trajectory data respectively.

3. The method of claim 2, wherein the transition corresponds to at least one of a turn, a user activity, and a vehicle use pattern.

4. The method of claim 2, wherein selecting the best match comprises identifying matching patterns of sets of anchor points from two or more paths.

5. The method of claim 4, wherein identifying matching patterns of anchor points comprises identifying a turn.

6. The method of claim 5, wherein identify a turn comprises selecting a sub-trajectory step length and determining whether a threshold angle condition is satisfied.

7. The method of claim 6, wherein the step length is selected to detect a mild turn.

8. The method of claim 6, wherein the step length is selected to detect a sharp turn.

9. The method of claim 6, wherein a step length is adjusted to detect both mild turns and sharp turns.

10. The method of claim 9, further comprising identifying significant turns by selecting a mild turn and an end turn from a combination of sharp turns.

11. The method of claim 1, wherein selecting the best match further comprises:

identifying possible pairs of crowdsourced paths among the plurality of crowdsourced paths;

scoring each of the possible pairs of crowdsourced paths based on a distance between their anchor points respectively; and selecting the best match of paths based on the scoring for each of the possible pairs of crowdsourced paths.

12. The method of claim 11, wherein each possible pair of individual crowdsourced paths is further based at least in part on a similarity score of their associated ambient signals respectively.

13. The method of claim 12, wherein the similarity score is determined based on calculating an ambient signal similarity and dividing the ambient signal similarity by a distance factor.

14. The method of claim 5, wherein matches of trajectory data of two crowdsourced paths have trajectory data translated and rotated to adjust the trajectory data into an alignment.

15. The method of claim 1, wherein the associated ambient signal comprises at least one member from the group consisting of a Wi-Fi signal, a Bluetooth signal, sound, an image signal, a magnetic signal, and an optical signal.

16. The method of claim 1, wherein each mobile device includes at least one sensor to generate trajectory data.

17. A system comprising:

a processor; a memory;

a trajectory merging and correction unit;

a trajectory matching unit; and a mapping unit;

wherein the trajectory merging and correction unit, the trajectory matching unit and the mapping unit are implemented using one or more software modules arranged to be executed by the processor and stored in the memory;

the system configured to receive trajectory data from a plurality of mobile devices on a plurality of crowdsourced paths, wherein the trajectory data for each path of the plurality of paths is associated with at least one ambient signal; and the processor configured to:

identify, by the trajectory merging and correction unit, a set of anchor points in the trajectory data for each path of the plurality of crowdsourced paths respectively, generate a set of permutations of each set of anchor points from each path of the plurality of crowdsourced paths respectively, select, by the trajectory matching unit, a best match of paths among the plurality of crowdsourced paths, the best match of paths selected at least partially based on (a) an evaluation of the set of permutations of each set of anchor points from each path to provide best matching sets of anchor points and (b) a determination of a signal similarity score between the associated ambient signal for each path of the plurality of crowdsourced paths respectfully, determine a shape of a path in a geographic area based on the best match of paths, and store the shape of the path in the geographic area in the memory.

* * * * *